United States Patent
Sakikawa et al.

(10) Patent No.: US 10,265,656 B2
(45) Date of Patent: Apr. 23, 2019

(54) WATER ABSORBENT MATERIAL, DEHUMIDIFICATION DEVICE, AND DEHUMIDIFICATION METHOD

(71) Applicants: Sharp Kabushiki Kaisha, Sakai, Osaka (JP); THE SCHOOL CORPORATION KANSAI UNIVERSITY, Suita-shi, Osaka (JP)

(72) Inventors: Nobuki Sakikawa, Sakai (JP); Yoshihiro Uramoto, Sakai (JP); Takashi Miyata, Suita (JP)

(73) Assignees: SHARP KABUSHIKI KAISHA, Sakai (JP); THE SCHOOL CORPORATION KANSAI UNIVERSITY, Osaka (JP)

( * ) Notice: Subject to any disclaimer, the term of this patent is extended or adjusted under 35 U.S.C. 154(b) by 75 days.

(21) Appl. No.: 15/504,709

(22) PCT Filed: Aug. 27, 2015

(86) PCT No.: PCT/JP2015/074283
§ 371 (c)(1),
(2) Date: Feb. 17, 2017

(87) PCT Pub. No.: WO2016/059891
PCT Pub. Date: Apr. 21, 2016

(65) Prior Publication Data
US 2017/0266610 A1    Sep. 21, 2017

(30) Foreign Application Priority Data
Oct. 16, 2014 (JP) .................. 2014-212083

(51) Int. Cl.
*B01D 53/26* (2006.01)
*F24F 3/14* (2006.01)
(Continued)

(52) U.S. Cl.
CPC ......... *B01D 53/28* (2013.01); *B01D 53/0438* (2013.01); *B01D 53/261* (2013.01);
(Continued)

(58) Field of Classification Search
CPC .. B01D 53/0438; B01D 53/261; B01D 53/28; B01D 2253/202; B01D 2259/404;
(Continued)

(56) References Cited

U.S. PATENT DOCUMENTS

| 6,273,942 | B1* | 8/2001 | Jersby ................. B65D 81/266 55/424 |
| 2013/0087046 | A1* | 4/2013 | Aumueller ......... B01D 53/0415 96/118 |
| 2017/0276380 | A1* | 9/2017 | Sakikawa ................ B01J 20/24 |

FOREIGN PATENT DOCUMENTS

| JP | 63-240921 A | 10/1988 |
| JP | 05-301014 A | 11/1993 |

(Continued)

OTHER PUBLICATIONS

Official Communication issued in International Patent Application No. PCT/JP20151/074283, dated Nov. 2, 2015.

*Primary Examiner* — Frank M Lawrence, Jr.
(74) *Attorney, Agent, or Firm* — Keating & Bennett, LLP

(57) ABSTRACT

A moisture absorbing material (i) having has (a) a first state in which the moisture absorbing material is capable of absorbing moisture, and (b) a second state in which the moisture absorbing material releases the moisture absorbed in the first state, and (ii) has a property of changing from the first state to the second state in response to an external stimulus and returning from the second state to the first state when the external stimulus disappears, the moisture absorbing material includes: first through fourth moisture absorbing bodies which have respective different stimulus response
(Continued)

levels and are provided in order of stimulus response level so as to be in contact with one another.

7 Claims, 10 Drawing Sheets

(51) Int. Cl.
    *B01D 53/28*      (2006.01)
    *F24F 11/89*      (2018.01)
    *B01D 53/04*      (2006.01)
    *B01J 20/26*      (2006.01)
    *B01J 20/28*      (2006.01)
    *B01J 20/34*      (2006.01)

(52) U.S. Cl.
    CPC ....... *B01J 20/261* (2013.01); *B01J 20/28052* (2013.01); *B01J 20/3425* (2013.01); *B01J 20/3483* (2013.01); *F24F 3/14* (2013.01); *F24F 3/1411* (2013.01); *F24F 3/1429* (2013.01); *F24F 11/89* (2018.01); *B01D 2253/202* (2013.01); *B01D 2259/404* (2013.01)

(58) Field of Classification Search
    CPC .......... F24F 3/14; F24F 3/1411; F24F 3/1429; F24F 11/89; B01J 20/261; B01J 20/28052; B01J 20/3425; B01J 20/2383
    USPC ..... 95/113, 117–119, 126; 96/121, 125, 132, 96/143, 154; 34/80, 472, 473
    See application file for complete search history.

(56) References Cited

FOREIGN PATENT DOCUMENTS

| | | |
|---|---|---|
| JP | 2001-259349 A | 9/2001 |
| JP | 2002-310485 A | 10/2002 |
| JP | 2003-144833 A | 5/2003 |
| JP | 2005-034838 A | 2/2005 |

\* cited by examiner

WATER ABSORBENT MATERIAL, DEHUMIDIFICATION DEVICE, AND DEHUMIDIFICATION METHOD

TECHNICAL FIELD

The present invention relates to: a moisture absorbing material (i) which has (a) a first state in which the moisture absorbing material is capable of absorbing moisture and (b) a second state in which the moisture absorbing material releases the moisture absorbed in the first state and (ii) which has a property of changing from the first state to the second state in response to an external stimulus and returning from the second state to the first state when the external stimulus disappears; a dehumidifying device; and a dehumidifying method.

BACKGROUND ART

Conventionally, dehumidifying devices and humidity control devices are typified by two types: a refrigeration cycle system and a zeolite system.

The refrigeration cycle system includes a compressor, and is a system in which indoor air is dehumidified by causing moisture in the air to condense through cooling the indoor air with the use of an evaporator.

Meanwhile, the zeolite system uses a rotor obtained by processing, into the form of a rotor, a hygroscopic porous material such as zeolite. Specifically, in the zeolite system, the rotor is made to temporarily absorb moisture in indoor air. Subsequently, the rotor, which has thus absorbed the moisture, is exposed to high-temperature warm air generated by an electric heater, so that the moisture in the rotor is taken out as high-temperature, high-humidity air. Then, the high-temperature, high-humidity air is cooled by indoor air, so that the moisture in the high-temperature, high-humidity air is condensed and therefore the indoor air is dehumidified.

Known examples of the refrigeration cycle system include, for example, a dehumidifier disclosed in Patent Literature 1. Known examples of the zeolite system include a dehumidifier disclosed in Patent Literature 2 and a dehumidifier disclosed in Patent Literature 3.

Further, there is also, for example, a dehumidifying device, which is disclosed in Patent Literature 4 and in which respective characteristics of a refrigeration cycle system and a zeolite system are combined.

In addition, a so-called desiccant air conditioning system, in which air conditioning such as a cooling operation is carried out by causing a zeolite system, in which a moisture absorbing adsorbent such as silica gel or activated carbon is used, to adsorb and desorb moisture, has become prevalent as a large scale air conditioning system. Known examples of a desiccant air conditioning system include an open adsorption air conditioner disclosed in Patent Literature 5. Demands for protection of global environment have caused active development of highly efficient humidity control systems including such a desiccant air conditioning system.

CITATION LIST

Patent Literatures

[Patent Literature 1]
Japanese Patent Application Publication, Tokukai, No. 2002-310485 (Publication Date: Oct. 23, 2002)

[Patent Literature 2]
Japanese Patent Application Publication, Tokukai, No. 2001-259349 (Publication Date: Sep. 25, 2001)

[Patent Literature 3]
Japanese Patent Application Publication, Tokukai, No. 2003-144833 (Publication Date: May 20, 2003)

[Patent Literature 4]
Japanese Patent Application Publication, Tokukai, No. 2005-34838 (Publication Date: Feb. 10, 2005)

[Patent Literature 5]
Japanese Patent Application Publication, Tokukaihei, No. 5-301014 (Publication Date: Nov. 16, 1993)

SUMMARY OF INVENTION

Technical Problem

There exist many kinds of highly moisture absorbing materials or highly adsorbent materials for use in each of a zeolite system dehumidifying device and a desiccant air conditioning system. There also exists a plurality of stimuli-responsive materials including, for example, poly(N-isopropylacrylamide) (pNIPAM). Note, however, that for a highly moisture absorbing material or a highly adsorbent material that has efficiently absorbed moisture, there exists no technique for repeatedly taking out water directly from a moisture absorbing material without carrying out a step of evaporating moisture by setting a temperature of the moisture at a temperature of, for example, 200° C. This requires a high temperature of, for example, 200° C. and thus causes a problem of low efficiency.

Specifically, poly(N-isopropylacrylamide) (pNIPAM) (mentioned earlier) is known as a material that absorbs and discharges water by repeatedly swelling and shrinking in response to an environmental stimulus such as heat, an electrical field, light, or pH. Note, however, the pNIPAM which is gelated and then dried has water vapor absorbency of at most approximately several ten percent or an equivalence of its own weight. Then, a large amount of gel and a water collecting technique are required so that absorbed moisture is formed into a waterdrop in response to an environmental stimulus.

As a highly moisture absorbing material, there exists sodium hydroxide, sodium salt, or the like. Note, however, that due to solation of such a highly moisture absorbing material in accordance with moisture absorption, a moisture absorbing material that does not lose its shape is being studied. Known examples of a gelated polymeric material include acrylic acid, PolyEthylene Glycol (PEG), 2-methacryloyloxyethyl phosphorylcholine (MPC), alginic acid, cellulose, and the like. Note, however, that such a gelated polymeric material alone is forced to desorb moisture from a moisture absorbing material by forming the moisture into water vapor.

The present invention has been made in view of the conventional problems, and an object of the present invention is to provide a moisture absorbing material, a dehumidifying device, and a dehumidifying method each of which makes it possible to efficiently release absorbed moisture without use of a large quantity of heat.

Solution to Problem

In order to attain the object, a moisture absorbing material in accordance with an aspect of the present invention (i) having (a) a first state in which the moisture absorbing material is capable of absorbing moisture and (b) a second state in which the moisture absorbing material releases the moisture absorbed in the first state and (ii) having a property of changing from the first state to the second state in response to an external stimulus and returning from the second state to the first state when the external stimulus disappears, the moisture absorbing material includes: first through Nth moisture absorbing bodies (N is an integer of not less than 2) which have respective different stimulus response levels and are provided in order of stimulus response level so as to be in contact with one another.

In order to attain the object, a dehumidifying device in accordance with an aspect of the present invention includes: a moisture absorbing material mentioned above; a heating section for heating first through Nth moisture absorbing bodies (N is an integer of not less than 2); and a control section for subjecting the first through Nth moisture absorbing bodies (N is an integer of not less than 2), each having absorbed moisture, to control of heating by the heating section so that the first through Nth moisture absorbing bodies (N is an integer of not less than 2) each have a temperature in a range higher than a corresponding temperature sensitive point of each of the first through Nth moisture absorbing bodies (N is an integer of not less than 2).

In order to attain the object, a dehumidifying method in accordance with an aspect of the present invention using a moisture absorbing material (i) having (a) a first state in which the moisture absorbing material is capable of absorbing moisture and (b) a second state in which the moisture absorbing material releases the moisture absorbed in the first state and (ii) having a property of changing from the first state to the second state in response to an external stimulus and returning from the second state to the first state when the external stimulus disappears, the dehumidifying method includes the steps of: providing first through Nth moisture absorbing bodies (N is an integer of not less than 2) in order of stimulus response level so that the first through Nth moisture absorbing bodies (N is an integer of not less than 2) are in contact with one another, the first through Nth moisture absorbing bodies (N is an integer of not less than 2) having respective different stimulus response levels; and providing each of the first through Nth moisture absorbing bodies (N is an integer of not less than 2), each having absorbed moisture, with a stimulus whose level is higher than a corresponding stimulus response level of each of the first through Nth moisture absorbing bodies (N is an integer of not less than 2).

Note that a stimulus response level refers to a threshold of a stimulus at which threshold the moisture absorbing material changes from the first state to the second state or returns from the second state to the first state.

Advantageous Effects of Invention

An aspect of the present invention yields an effect of providing a moisture absorbing material, a dehumidifying device, and a dehumidifying method each of which makes it possible to efficiently release absorbed moisture without use of a large quantity of heat.

Figure 4:
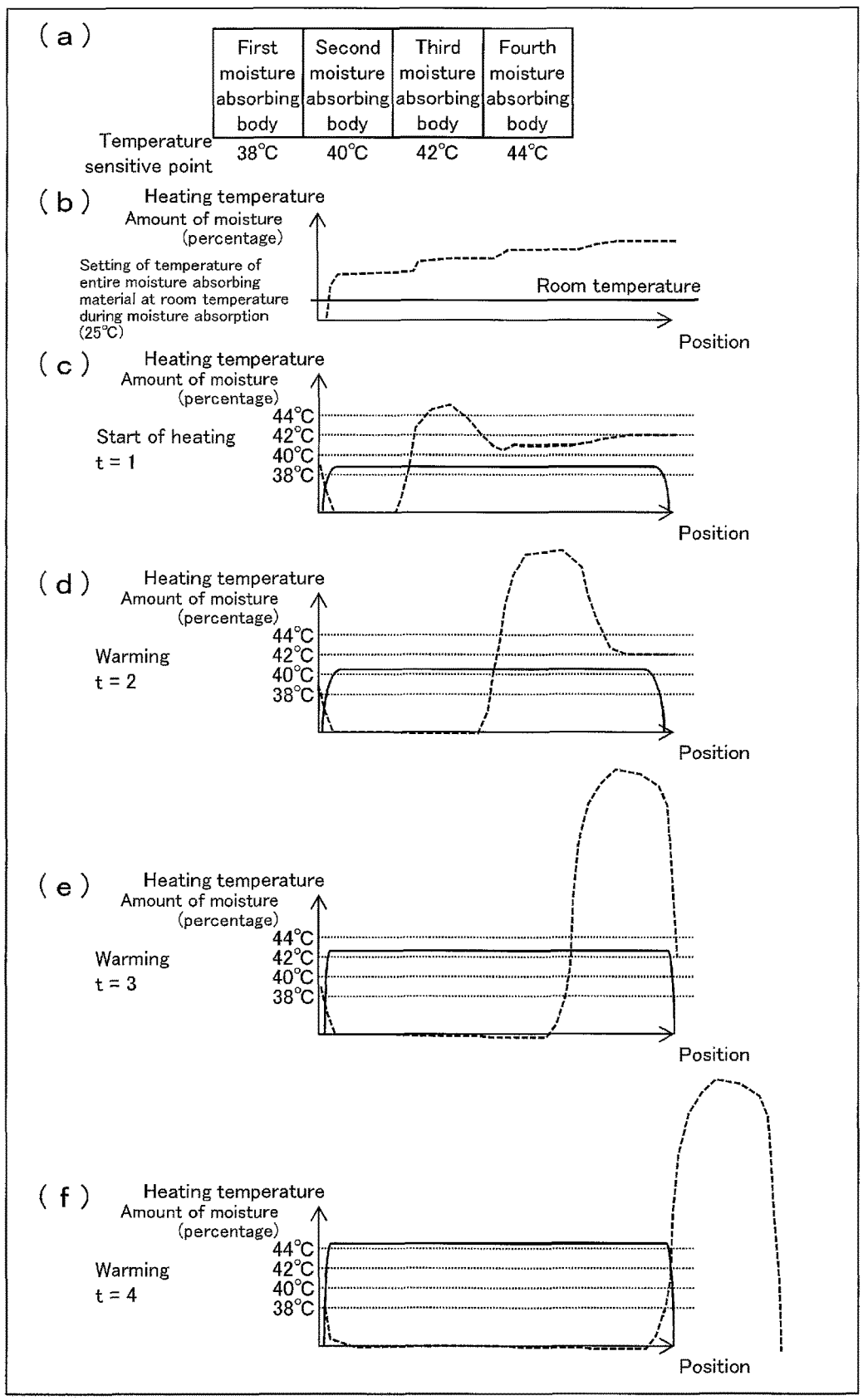

(a) of FIG. 4 illustrates a relationship between (a) an arrangement of the first through fourth moisture absorbing bodies of the moisture absorbing material and (b) a temperature sensitive point. (b) of FIG. 4 is a graph showing an amount of moisture of the first through fourth moisture absorbing bodies at a normal temperature. (c) of FIG. 4 is a graph showing an amount of moisture of the first through fourth moisture absorbing bodies when the moisture absorbing material is heated to a temperature higher than a temperature sensitive point of the first moisture absorbing body. (d) of FIG. 4 is a graph showing an amount of moisture of the first through fourth moisture absorbing bodies when the moisture absorbing material is heated to a temperature higher than a temperature sensitive point of the second moisture absorbing body. (e) of FIG. 4 is a graph showing an amount of moisture of the first through fourth moisture absorbing bodies when the moisture absorbing material is heated to a temperature higher than a temperature sensitive point of the third moisture absorbing body. (f) of FIG. 4 is a graph showing an amount of moisture of the first through fourth moisture absorbing bodies when the moisture absorbing material is heated to a temperature higher than a temperature sensitive point of the fourth moisture absorbing body.

Figure 5:
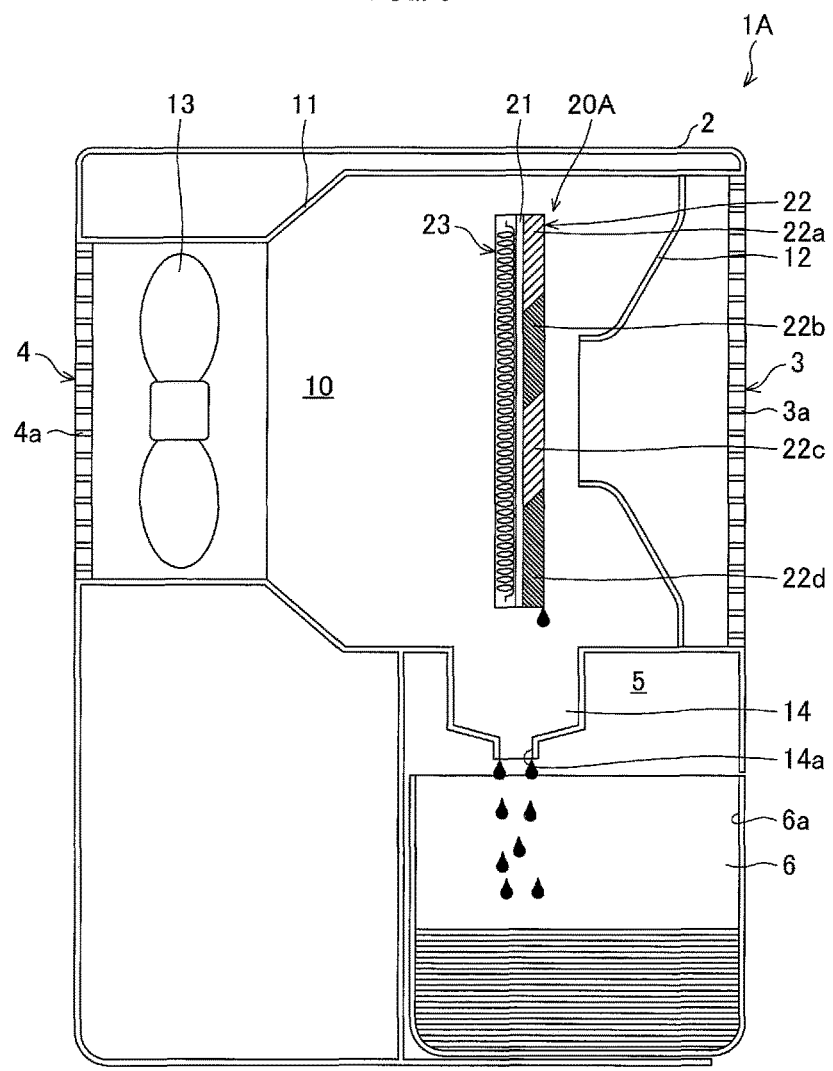

FIG. 5 is a vertical cross-sectional view which is obtained when the dehumidifying device including the moisture absorbing material is seen from the side surface direction thereof and which illustrates a configuration of the dehumidifying device during release of moisture.

Figure 6:
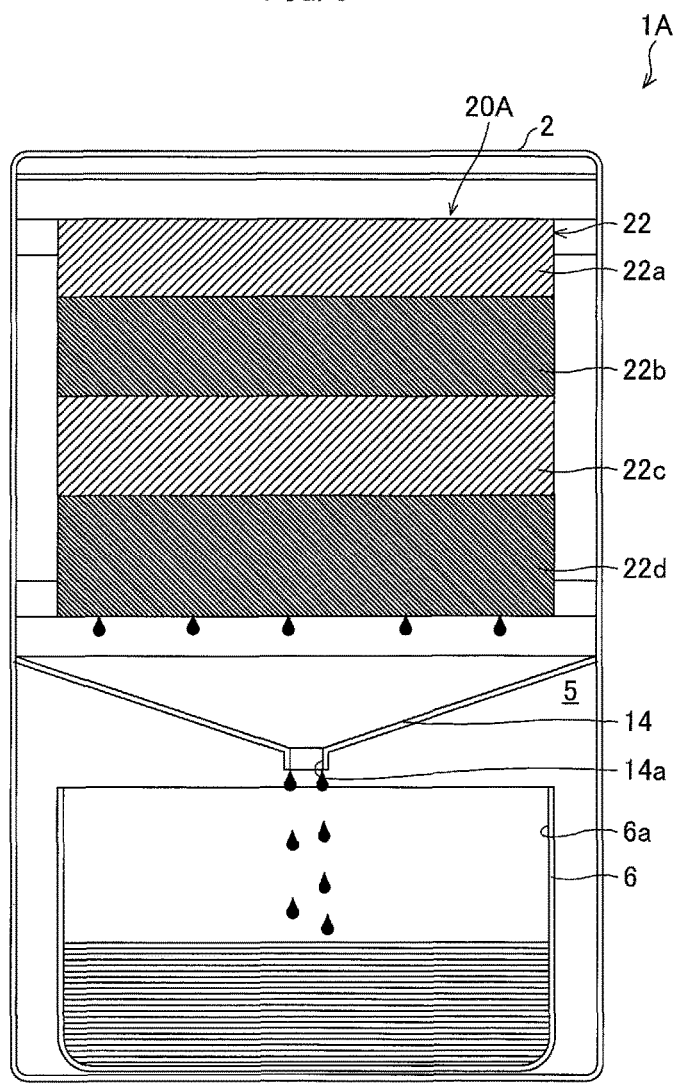

FIG. 6 is a vertical cross-sectional view which is obtained when the dehumidifying device including the moisture absorbing material is seen from a front surface direction thereof and which illustrates the configuration of the dehumidifying device during release of moisture.

Figure 7:
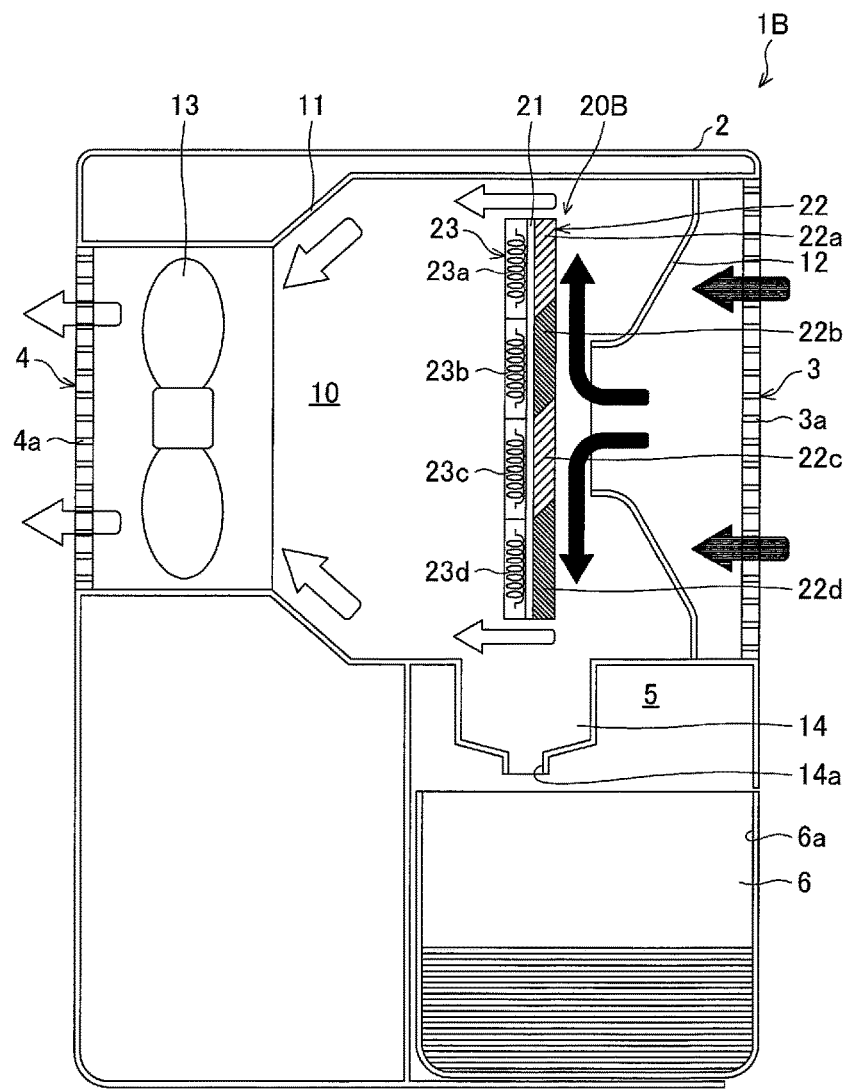

FIG. 7 is a vertical cross-sectional view which is obtained when a dehumidifying device including a moisture absorbing unit including a moisture absorbing material of Embodiment 2 of the present invention is seen from a side surface direction thereof and which illustrates a configuration of the dehumidifying device.

Figure 8:
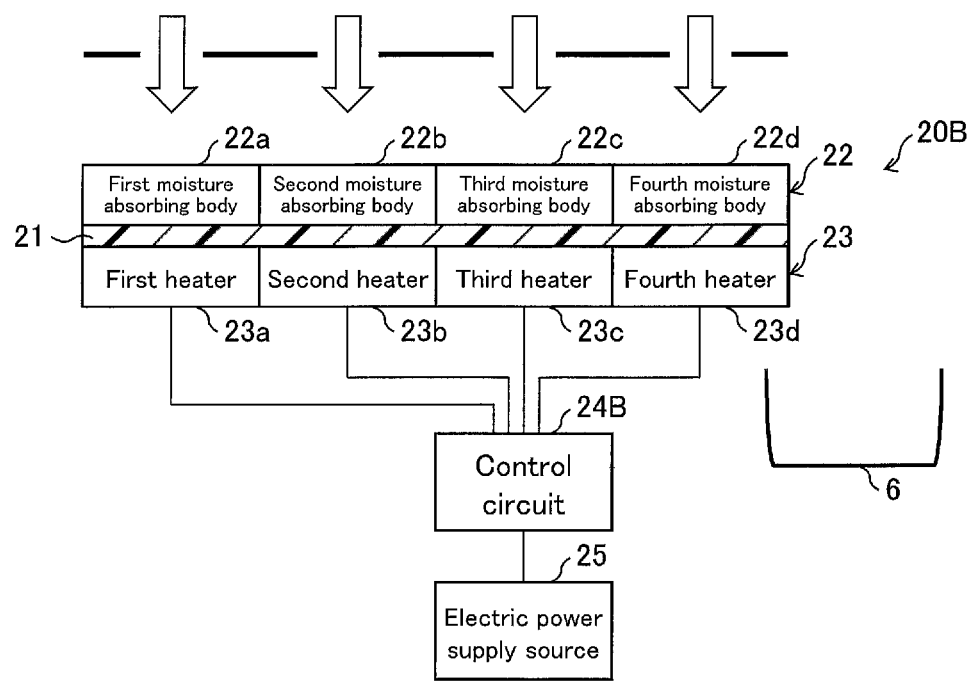

FIG. 8 is a block diagram illustrating a configuration of the moisture absorbing unit of the dehumidifying device, the moisture absorbing unit including the moisture absorbing material.

Figure 9:
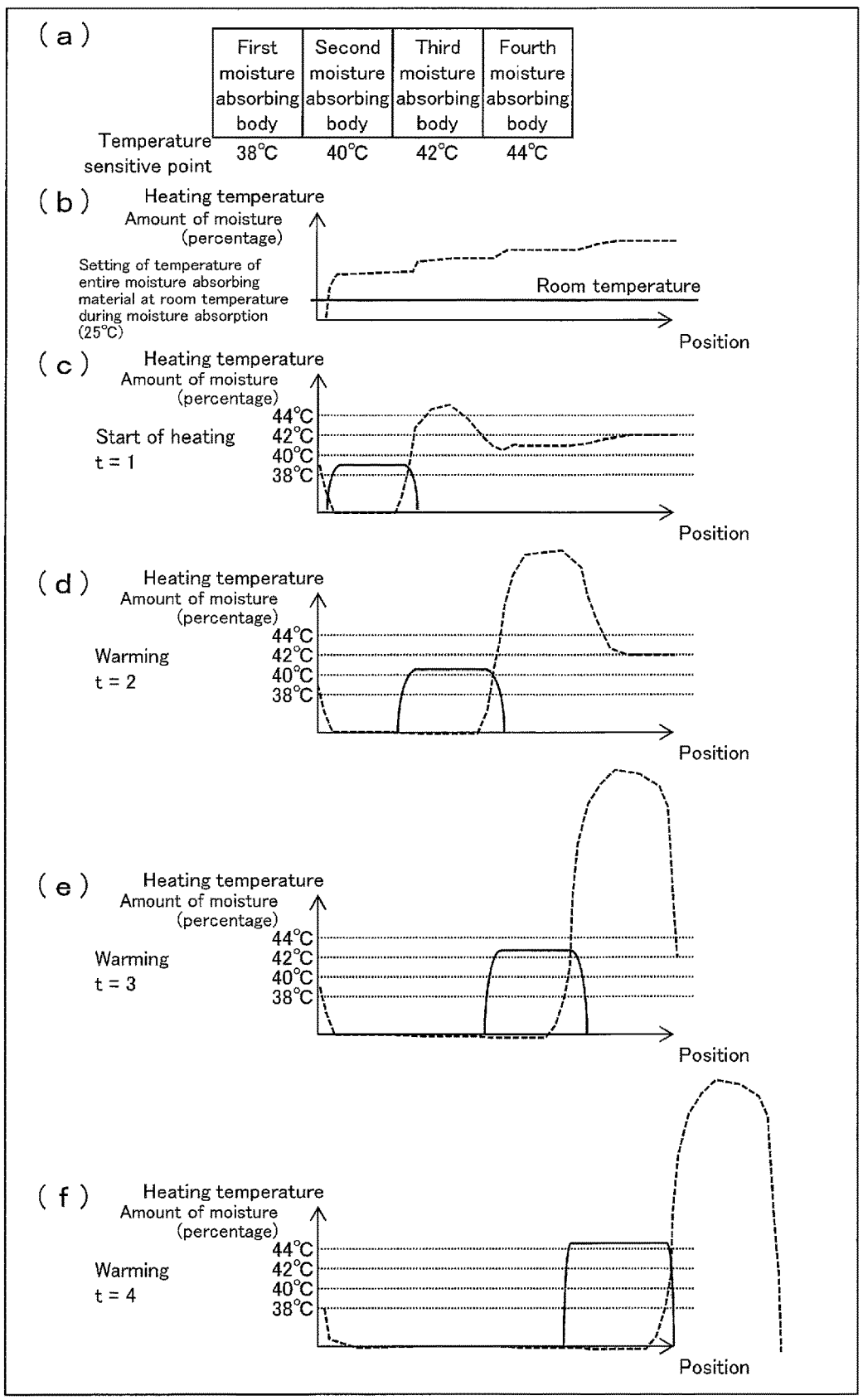

(a) of FIG. 9 illustrates a relationship between (a) an arrangement of first through fourth moisture absorbing bodies of the moisture absorbing material and (b) a temperature sensitive point. (b) of FIG. 9 is a graph showing an amount of moisture of the first through fourth moisture absorbing bodies at a normal temperature. (c) of FIG. 9 is a graph showing an amount of moisture of the first through fourth moisture absorbing bodies when only the first moisture absorbing body is heated to a temperature higher than a temperature sensitive point of the first moisture absorbing body. (d) of FIG. 9 is a graph showing an amount of moisture of the first through fourth moisture absorbing bodies when only the second moisture absorbing body is heated to a temperature higher than a temperature sensitive point of the second moisture absorbing body. (e) of FIG. 9 is a graph showing an amount of moisture of the first through fourth moisture absorbing bodies when only the third moisture absorbing body is heated to a temperature higher than a temperature sensitive point of the third moisture absorbing body. (f) of FIG. 9 is a graph showing an amount of moisture of the first through fourth moisture absorbing bodies when only the fourth moisture absorbing body is heated to a temperature higher than a temperature sensitive point of the fourth moisture absorbing body.

Figure 10:
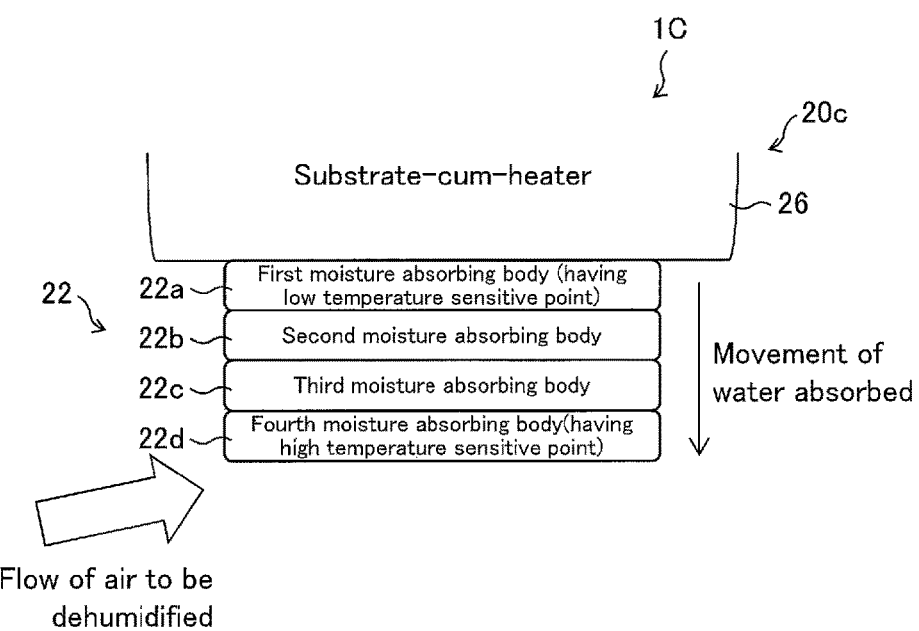

FIG. 10 is a vertical cross-sectional view illustrating a moisture absorbing unit of a dehumidifying device of Embodiment 3 of the present invention, the moisture absorbing unit including a moisture absorbing material.

DESCRIPTION OF EMBODIMENTS

Embodiment 1

An embodiment of the present invention is described below with reference to FIGS. 1 through 6.

Figure 1:
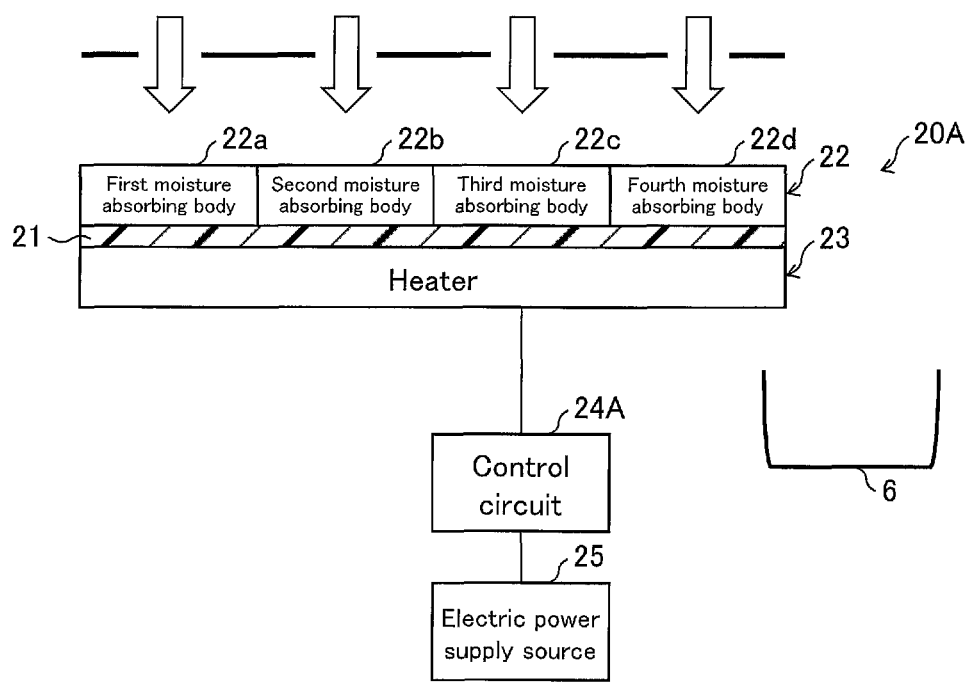
FIG. 1 is a block diagram illustrating a configuration of a moisture absorbing unit including a moisture absorbing material of Embodiment 1 of the present invention.
Figure 2:
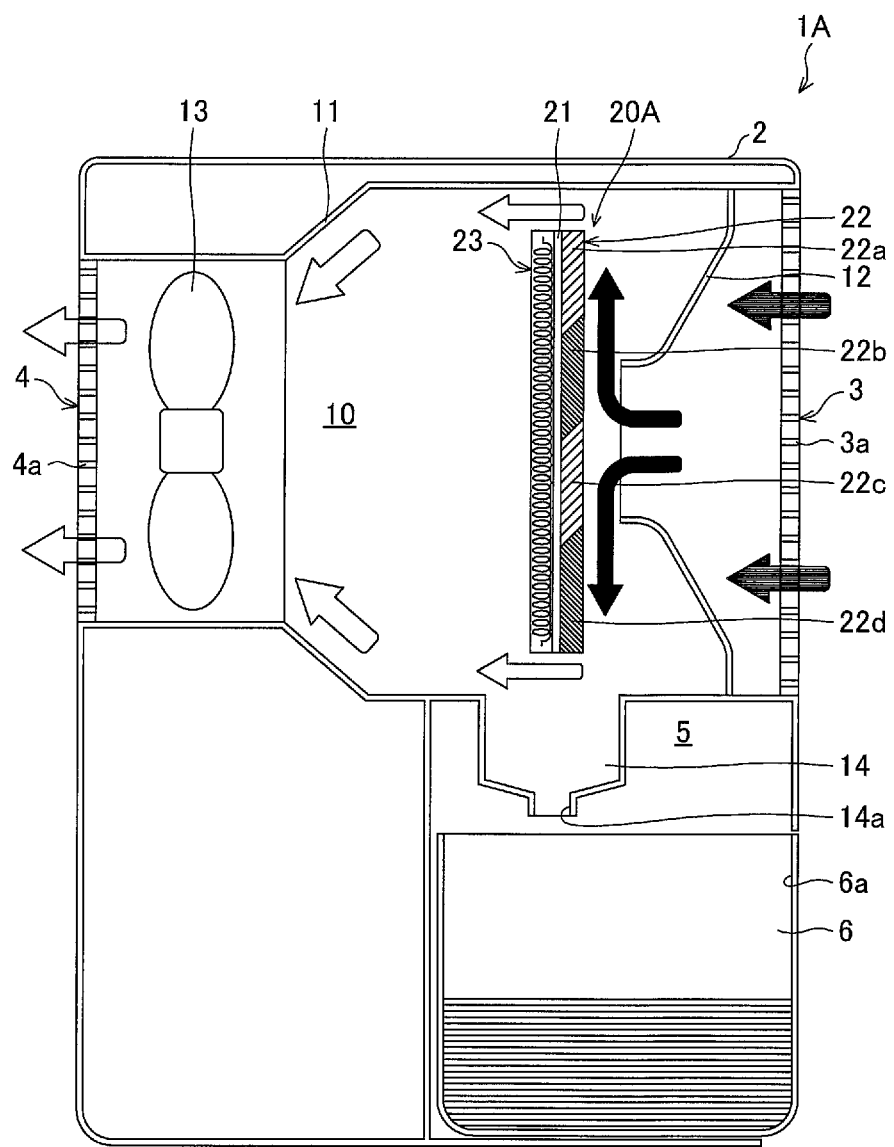
FIG. 2 is a vertical cross-sectional view which is obtained when a dehumidifying device including the moisture absorbing material is seen from a side surface direction thereof and which illustrates a configuration of the dehumidifying device during moisture absorption.

A configuration of a dehumidifying device including a moisture absorbing material of Embodiment 1 is described with reference to FIGS. 1 and 2. FIG. 2 is a vertical cross-sectional view which is obtained when a dehumidifying device 1A including the moisture absorbing material 22 is seen from a side surface direction thereof and which illustrates a configuration of the dehumidifying device 1A during moisture absorption. Note that a temperature sensitive polymeric gel dried body as a moisture absorbing material not only adsorbs on a surface thereof but also absorbs thereinto moisture (water vapor) in the air. Such a phenomenon is academically referred to as "sorption". Note here that in a case where a temperature of the temperature sensitive polymeric gel dried body is raised to a temperature sensitive point, dehydration in which water in liquid form is released occurs, and the released water is moisture contained in the temperature sensitive polymeric gel dried body. Thus, for emphasis, moisture absorption is herein defined as "absorption of moisture (water vapor)", and release of water in liquid form is herein defined as "dehydration or water release".

As illustrated in FIG. 2, the dehumidifying device 1A of Embodiment 1 includes a housing 2, which has a shape of a rectangular parallelepiped. The housing 2 includes an air inlet 3 provided on a front surface of an upper part of the housing 2 and including a grating 3a, an air outlet 4 provided on a rear surface of the upper part of the housing 2 and including a grating 4a, and a water drain tank containing section 5 provided on the front surface side of a lower part of the housing 2 and containing a water drain tank 6 (described later). The housing 2 is made of resin or metal. Note that the housing 2 can have a shape that is not necessarily limited to the shape of a rectangular parallelepiped and is, for example, another shape of, for example, a multiangular tube, a cylinder, or an elliptic cylinder.

As illustrated in FIG. 2, in an upper part of an inside of the dehumidifying device 1A, an air circulation wall 11 constituting an air circulation passage 10 is provided. In the air circulation passage 10, the air inlet 3 including the grating 3a, an intake air flow restricting section 12, a moisture absorbing unit 20A, an air blowing fan 13, and the air outlet 4 including the grating 4a are provided in this order from the entrance side, which is the front surface side of the housing 2.

The air circulation wall 11 constituting the air circulation passage 10 has, in a lower part thereof, a waterdrop receiving section 14, provided under the moisture absorbing unit 20A, for receiving a waterdrop having dropped from the moisture absorbing unit 20A. The waterdrop receiving section 14 has an opening 14a at a lower end thereof. Under the opening 14a, the water drain tank 6, which has an opening 6a at an upper end thereof, is provided.

Through the air inlet 3, air in a room in which the dehumidifying device 1A is provided is taken in.

The intake air flow restricting section 12 is provided so as to be immediately followed by the moisture absorbing unit 20A into which air is to flow. Specifically, according to Embodiment 1, the moisture absorbing material 22 of the moisture absorbing unit 20A includes four first through fourth moisture absorbing bodies 22a through 22d that are connected together so as to be in contact with one another (described later). Thus, the intake air flow restricting section 12 narrows an outlet so as to cause moist air having flowed through the air inlet 3 to collide with a center of the moisture absorbing material 22. This causes the moist air having flowed through the air inlet 3 to collide with the center of the moisture absorbing material 22 and thereafter equally move from the center toward both ends of the moisture absorbing material 22. As a result, the moist air collides with the moisture absorbing material 22 while equally moving toward both ends of the moisture absorbing material 22. This allows the moisture absorbing material 22 to efficiently absorb moisture of moist air.

The moisture absorbing unit 20A includes a characteristic feature of Embodiment 1 and is directed to absorb moisture contained in air having flowed into the inside of the dehumidifying device 1A and to release the moisture in a form of a waterdrop. Note that a specific structure of the moisture absorbing unit 20A is described later.

The air circulation wall 11 constituting the air circulation passage 10 is provided so as to have a space between the air circulation wall 11 and a contour of the moisture absorbing unit 20A. This causes the moist air having flowed through the air inlet 3 to collide with the center of the moisture absorbing material 22 of the moisture absorbing unit 20A, thereafter equally move from the center of the moisture absorbing material 22 toward both ends of the moisture absorbing material 22, pass through a space between the moisture absorbing material 22 and the air circulation wall 11, and exit through the air outlet 4.

The waterdrop receiving section 14 of the air circulation wall 11, which waterdrop receiving section 14 is provided under the moisture absorbing material 22, has a floor that is provided so as to downwardly incline toward the opening 14a. This prevents waterdrops having dropped from the moisture absorbing material 22 from collecting in the waterdrop receiving section 14.

The waterdrops discharged from the waterdrop receiving section 14 fall through the opening 14a and collect in the water drain tank 6. In a case where the water drain tank 6 is filled with water, since it is possible to draw the water drain tank 6 from the water drain tank containing section 5, it is possible to easily empty the water from the water drain tank 6. As a result, according to Embodiment 1, the water drain tank 6 preferably has a front surface that is made of a transparent member such as glass so that a water level of stagnant water can be checked.

Next, a configuration of the moisture absorbing unit 20A of Embodiment 1 is specifically described below with reference to FIG. 1. FIG. 1 is a block diagram illustrating the configuration of the moisture absorbing unit 20A including the moisture absorbing material 22 of Embodiment 1.

The moisture absorbing unit 20A of Embodiment 1 includes the moisture absorbing material 22, a substrate 21, and a heater 23. As illustrated in FIG. 1, the moisture absorbing material 22 is firmly fixed to a top surface of the substrate 21, and the heater 23 is provided on a back surface of the substrate 21 and serves as a heating section.

The substrate 21 is, for example, a flat plate that is made of resin and has a quadrate shape. Note, however, that according to an embodiment of the present invention, the substrate 21 can be made of a base material that is not necessarily limited to resin and is metal or ceramic. Further, the substrate 21 preferably has a high thermal conductivity. In addition, the substrate 21 does not need to be a quadrate plate and can be a polygonal plate, a circular plate, or an elliptic plate.

The moisture absorbing material 22, which is firmly fixed to the top surface of the substrate 21, is made of a moisture absorbing material of polymeric gel. According to Embodiment 1, the moisture absorbing material 22 is firmly fixed to the top surface of the substrate 21 by, for example, being applied to the top surface of the substrate 21.

The moisture absorbing material 22 has (a) a first state in which the moisture absorbing material 22 is capable of absorbing moisture and (b) a second state in which the moisture absorbing material 22 releases the moisture absorbed in the first state, and has a property of changing from the first state to the second state in response to an external stimulus and returning from the second state to the first state when the external stimulus disappears. Specifically, the moisture absorbing material 22 has a property of being hydrophilic in a temperature range not higher than a temperature sensitive point, which is a constant temperature, and being hydrophobic in a temperature range higher than the temperature sensitive point. With the configuration, the moisture absorbing material 22 absorbs, in the temperature range not higher than the temperature sensitive point, i.e., a temperature range of an environment which is to be subjected to dehumidification and has a normal temperature, moisture contained in air passing through the moisture absorbing unit 20A, whereas the moisture absorbing material 22 releases the absorbed moisture in a form of a waterdrop in the temperature range higher than the temperature sensitive point. Such a phenomenon is a reversible operation. Thus, by repeatedly causing a temperature change to the moisture absorbing material 22, it is possible to repeatedly carry out absorption, at a normal temperature, of moisture contained in air and release of absorbed moisture by heating.

Further, according to Embodiment 1, the moisture absorbing material 22 includes the first through fourth moisture absorbing bodies 22a through 22d which have respective different temperature sensitive points and are provided in order of temperature sensitive point so as to be in contact with one another. That is, according to Embodiment 1, the first through fourth moisture absorbing bodies 22a through 22d are integrally connected together so as to be in side-by-side contact with one another. Note here that according to Embodiment 1, the first through fourth moisture absorbing bodies 22a through 22d are integrally connected together in a shape of, for example, a flat plate so as to be in side-by-side contact with one another. Note, however, that the first through fourth moisture absorbing bodies 22a through 22d only need to be configured such that a surface of contact between any adjacent moisture absorbing bodies of the first through fourth moisture absorbing bodies 22a through 22d has the largest possible area and do not necessarily need to be in a shape of a flat plate. From the viewpoint of a rate of moisture absorption, the first through fourth moisture absorbing bodies 22a through 22d are not necessarily preferably large. Note, however, that the first through fourth moisture absorbing bodies 22a through 22d are preferably shaped such that an area of contact between any adjacent moisture absorbing bodies of the first through fourth moisture absorbing bodies 22a through 22d is increased within a range acceptable from the viewpoint of a size of an entire moisture absorbing body as a core element, the size being determined in accordance with, for example, specifications of a dehumidifying device.

Note that according to Embodiment 1, the moisture absorbing material 22 includes a plurality of moisture absorbing bodies such as the first through fourth moisture absorbing bodies 22a through 22d. Note here that the number of the plurality of moisture absorbing bodies does not necessarily need to be four and the plurality of moisture absorbing bodies can be the first through Nth moisture absorbing bodies 22a through 22N (N is an integer of not less than 2).

According to Embodiment 1, as illustrated in FIG. 2, any adjacent moisture absorbing bodies of the first through fourth moisture absorbing bodies 22a through 22d are in contact with each other at a boundary therebetween so that the any adjacent moisture absorbing bodies each incline relatively to a plane orthogonal to the first through fourth moisture absorbing bodies 22a through 22d, which are planar. Note, however, that the any adjacent moisture absorbing bodies do not necessarily need to be in contact with each other as described above. For example, the any adjacent moisture absorbing bodies can be in contact with each other in a plane orthogonal to the first through fourth moisture absorbing bodies 22a through 22d, which are planar. Further, it is unnecessary for each of the any adjacent moisture absorbing bodies of the first through fourth moisture absorbing bodies 22a through 22d to have a contact surface in which the any adjacent moisture absorbing bodies face each other at respective edges of flat surfaces thereof. For example, the second moisture absorbing body 22b in a shape of a flat plate and the first moisture absorbing body 22a in a shape of a flat plate can be in contact with each other such that a part of an edge of the second moisture absorbing body 22b is placed on, i.e., overlaps with a part of an edge of the first moisture absorbing body 22a.

Note here that according to Embodiment 1, the first moisture absorbing body 22a has a temperature sensitive point of, for example, 38° C., the second moisture absorbing body 22b has a temperature sensitive point of, for example, 40° C., the third moisture absorbing body 22c has a temperature sensitive point of, for example, 42° C., and the fourth moisture absorbing body 22d has a temperature sensitive point of, for example, 42° C. In a case where the temperature sensitive points having the respective values above are employed and the first through fourth moisture absorbing bodies 22a through 22d are each heated to a temperature that is slightly higher than a normal temperature, the first through fourth moisture absorbing bodies 22a through 22d are made hydrophobic. Note that the temperature sensitive points do not necessarily need to have the respective values above and can have respective other values.

Note here that according to Embodiment 1, N-isopropylacrylamide-containing polymeric gel, for example is used as a material of the moisture absorbing material 22. The moisture absorbing material 22 which has such a configuration makes it possible to easily achieve a configuration in which (a) a hydrophilic state as a first state in which moisture can be absorbed in response to heat serving as a stimulus and (b) a hydrophobic state as a second state in which the absorbed moisture is released can be alternately changed. A person skilled in the art could have used temperature sensitive polymers such as poly(N-isopropylacrylamide) (pNIPAM) and a derivative thereof, and polyvinyl ether and a derivative thereof as materials to appropriately prepare a polymeric moisture absorbing material having a desired property.

To the back surface of the substrate 21, the heater 23, for example adheres. This allows the moisture absorbing material 22 to be heated via the substrate 21.

According to Embodiment 1, the heater 23 is provided as a single heater 23 for the four first through fourth moisture absorbing bodies 22a through 22d. Thus, as illustrated in FIG. 1, the heater 23 is provided with a set of a control circuit 24A and an electric power supply source 25 for carrying out temperature control with respect to the heater 23.

The heater 23 only needs to be capable of heating up to approximately 100° C. with a margin left. Specifically, in summertime, the dehumidifying device 1A may be used in an environment having a temperature of not less than 40° C. This makes it only necessary to apply, to dehydration of an element, heat having a temperature of 50° C. to 70° C. (approximately 60° C.). Thus, the heater 23 only needs to be capable of heating up to approximately 100° C.

The heater 23 of Embodiment 1 includes, for example, a heating wire such as a nichrome wire, or a high-resistance heating material such as AlN or silicon. According to Embodiment 1, the heater 23 collectively heats first through fourth heaters 23a through 23d. Such heating control is carried out by the control circuit 24A. Specifically, the control circuit 24A controls a supply of electric power by the electric power supply source 25 so as to allow heating by the heater 23 in an off state, in a state in which the moisture absorbing material 22 is heated and maintained at a constant temperature higher than the temperature sensitive point of the first moisture absorbing body 22a, in a state in which the moisture absorbing material 22 is heated and maintained at a constant temperature higher than the temperature sensitive point of the second moisture absorbing body 22b, in a state in which the moisture absorbing material 22 is heated and maintained at a constant temperature higher than the temperature sensitive point of the third moisture absorbing body 22c, or in a state in which the moisture absorbing material 22 is heated and maintained at a constant temperature higher than the temperature sensitive point of the fourth moisture absorbing body 22d. Note that the heater 23 which does not carry out heating needs to immediately release heat. Thus, a peripheral member of the heater 23 is preferably made of a highly heat conductive material, or the heater 23 is preferably provided with a fin or a fan for cooling.

Note here that the first through fourth moisture absorbing bodies 22a through 22d of Embodiment 1 have respective different temperature sensitive points. The following description discusses a method for changing the temperature sensitive points of the first through fourth moisture absorbing bodies 22a through 22d.

For example, in a case where a copolymer of N-isopropylacrylamide and acrylic acid Na (AAcNa) is used as a material of the moisture absorbing material 22, it is possible to increase a temperature sensitive point by increasing an amount of the acrylic acid Na (AAcNa).

Note that other than the above method, there exist many methods for changing the temperature sensitive points. It is also possible to increase a temperature sensitive point by, for example, copolymerizing hydrophilic monomers, e.g., by increasing an amount of acrylamide, dimethylacrylamide, vinylpyridine, or the like.

Meanwhile, a method for reducing a temperature sensitive point is exemplified by a method for copolymerizing hydrophobic monomers, e.g., a method for increasing an amount of an acrylate monomer, styrene, or the like. Addition of a hydrophobic monomer naturally causes a deterioration in moisture absorbency. This makes it necessary to use different hydrophobic monomers in accordance with an environment of usage and/or an intended use.

As a method in which gels having different temperature sensitive points are prepared so that the gels are in continuous contact with one another, the following method can be used at a laboratory level. For example, (a) N-isopropylacrylamide (NIPAM) which has not been polymerized and (b) a cross-linker and a polymerization promoter are mixed in water, a resultant mixture is poured into, for example, a laboratory dish in a quadrate shape (without regard to a shape), a hydrophilic or hydrophobic monomer (mentioned earlier) is fed to one end of the laboratory dish so as to be diffused by a micro-Brownian motion, and polymerization of a resultant mixture is started at an appropriate timing. This makes it possible to prepare gels whose temperature sensitive points are continuously changed.

Figure 3:
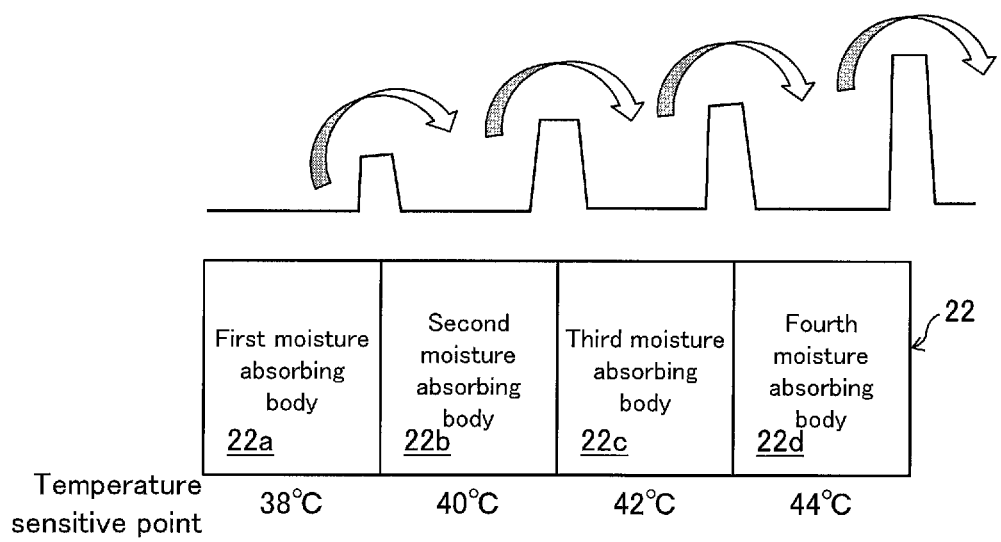
FIG. 3 schematically illustrates a relationship between (a) an arrangement of first through fourth moisture absorbing bodies which are included in the moisture absorbing material and have respective different temperature sensitive points and (b) movement of moisture.

An operation of the moisture absorbing unit 20A which has the configuration is described below with reference to FIG. 3. FIG. 3 schematically illustrates a relationship between (a) an arrangement of the first through fourth moisture absorbing bodies 22a through 22d which are included in the moisture absorbing material 22 of Embodiment 1 and have respective different temperature sensitive points and (b) movement of moisture.

The moisture absorbing material 22 of Embodiment 1 includes the first through fourth moisture absorbing bodies 22a through 22d which have respective different temperature sensitive points and are provided so as to be in side-by-side contact with one another.

As a result, as illustrated in FIG. 3, in a case where all the first through fourth moisture absorbing bodies 22a through 22d are set at a temperature not higher than their temperature sensitive points, i.e., in a case where all the first through fourth moisture absorbing bodies 22a through 22d are set at a temperature not higher than 38° C., which is the temperature sensitive point of the first moisture absorbing body 22a, all the first through fourth moisture absorbing bodies 22a through 22d are hydrophilic and thus absorb moisture. In this case, the fourth moisture absorbing body 22d which has a high temperature sensitive point is more hydrophilic than the first moisture absorbing body 22a which has a low temperature sensitive point. As a result, the fourth moisture absorbing body 22d absorbs a larger amount of moisture than the first moisture absorbing body 22a.

Next, in a case where the first through fourth moisture absorbing bodies 22a through 22d, each having absorbed moisture, as a whole are heated to a temperature higher than 38° C., which is the temperature sensitive point of the first moisture absorbing body 22a, moisture absorbed by the first moisture absorbing body 22a is divided into (i) moisture that moves outside the first moisture absorbing body 22a and (ii) moisture that moves to the second moisture absorbing body 22b which has a higher temperature sensitive point than the first moisture absorbing body 22a. As a result, the moisture which has moved to the second moisture absorbing body 22b is combined with moisture which has been originally absorbed by the second moisture absorbing body 22b.

Subsequently, in a case where the first through fourth moisture absorbing bodies 22a through 22d as a whole are heated, in an order of the second moisture absorbing body 22b, the third moisture absorbing body 22c, and the fourth moisture absorbing body 22d, to a temperature higher than a corresponding temperature sensitive point of each of the second moisture absorbing body 22b, the third moisture absorbing body 22c, and the fourth moisture absorbing body 22d, all moisture that has been collected in the fourth moisture absorbing body 22d can be formed into a waterdrop by last heating. Besides, since movement of moisture due to gravity can be used in a case where the fourth moisture absorbing body 22d is provided so as to be lower than the first moisture absorbing body 22a, moisture loss can be drastically reduced.

The operation of the moisture absorbing unit 20A which has the configuration is further specifically described with reference to (a) through (f) of FIG. 4 each of which illustrates movement of an amount of moisture. (a) of FIG. 4 illustrates a relationship between (a) an arrangement of the first through fourth moisture absorbing bodies 22a through 22d of the moisture absorbing material 22 and (b) a temperature sensitive point. (b) of FIG. 4 is a graph showing an amount of moisture of the first through fourth moisture absorbing bodies 22a through 22d at a normal temperature. (c) of FIG. 4 is a graph showing an amount of moisture of the first through fourth moisture absorbing bodies 22a through 22d when the moisture absorbing material 22 is heated to a temperature higher than the temperature sensitive point of the first moisture absorbing body 22a. (d) of FIG. 4 is a graph showing an amount of moisture of the first through fourth moisture absorbing bodies 22a through 22d when the moisture absorbing material 22 is heated to a temperature higher than the temperature sensitive point of the second moisture absorbing body 22b. (e) of FIG. 4 is a graph showing an amount of moisture of the first through fourth moisture absorbing bodies 22a through 22d when the moisture absorbing material 22 is heated to a temperature higher than the temperature sensitive point of the third moisture absorbing body 22c. (f) of FIG. 4 is a graph showing an amount of moisture of the first through fourth moisture absorbing bodies 22a through 22d when the moisture absorbing material 22 is heated to a temperature higher than the temperature sensitive point of the fourth moisture absorbing body 22d.

As illustrated in (a) and (b) of FIG. 4, in a case where all the first through fourth moisture absorbing bodies 22a through 22d are set at a temperature not higher than 38° C., which is the temperature sensitive point of the first moisture absorbing body 22a, i.e., in a case where all the first through fourth moisture absorbing bodies 22a through 22d are set at 25° C., which is a normal temperature, all the first through fourth moisture absorbing bodies 22a through 22d are hydrophilic and thus are in a moisture absorbing state. In this case, it is revealed that since the fourth moisture absorbing body 22d which has a high temperature sensitive point is more hydrophilic than the first moisture absorbing body 22a which has a low temperature sensitive point, the fourth moisture absorbing body 22d absorbs a larger amount of moisture than the first moisture absorbing body 22a.

Next, in a case where the first through fourth moisture absorbing bodies 22a through 22d, each having absorbed moisture, as a whole are heated to a temperature higher than 38° C., which is the temperature sensitive point of the first moisture absorbing body 22a, e.g., a temperature of 39° C., as shown by a broken line in (c) of FIG. 4, almost all the moisture absorbed by the first moisture absorbing body 22a moves to the second moisture absorbing body 22b which has a higher temperature sensitive point than the first moisture absorbing body 22a. As a result, the moisture which has moved to the second moisture absorbing body 22b is combined with moisture which has been originally absorbed by the second moisture absorbing body 22b, so that the second moisture absorbing body 22b has an amount of moisture which amount is shown by the broken line. Meanwhile, the first moisture absorbing body 22a has an amount of moisture of approximately 0 (zero).

Subsequently, in a case where the first through fourth moisture absorbing bodies 22a through 22d as a whole are heated, in an order of the second moisture absorbing body 22b, the third moisture absorbing body 22c, and the fourth moisture absorbing body 22d, to a temperature higher than a corresponding temperature sensitive point of each of the second moisture absorbing body 22b, the third moisture absorbing body 22c, and the fourth moisture absorbing body 22d, as shown by broken lines in (d), (e), and (f) of FIG. 4, it is revealed that a peak of the amount of moisture gradually moves to the third moisture absorbing body 22c and the fourth moisture absorbing body 22d. This reveals that an amount of all moisture that has been collected in the fourth moisture absorbing body 22d serves as an amount of moisture that can be sufficiently formed into a waterdrop by last heating.

Finally, a method of use in the dehumidifying device 1A of Embodiment 1 which dehumidifying device 1A has the configuration is described below with reference to FIGS. 2 (described earlier), 5, and 6. FIG. 5 is a vertical cross-sectional view which is obtained when the dehumidifying device 1A including the moisture absorbing material 22 is seen from the side surface direction thereof and which illustrates a configuration of the dehumidifying device 1A during release of moisture. FIG. 6 is a vertical cross-sectional view which is obtained when the dehumidifying device 1A including the moisture absorbing material 22 is seen from a front surface direction thereof and which illustrates the configuration of the dehumidifying device 1A during release of moisture.

As illustrated in FIG. 2, the control circuit 24A of the moisture absorbing unit 20A of the dehumidifying device 1A turns on an electric power supply source (not illustrated) of the air blowing fan 13 in a state in which the electric power supply source 25 of the heater 23 is off. This allows external air to flow through the air inlet 3 of the dehumidifying device 1A. Since a flow path for the external air is narrowed by the intake air flow restricting section 12, the external air collides with the center of the moisture absorbing material 22 of the moisture absorbing unit 20A. External moist air that has collided with the center of the moisture absorbing material 22 moves along the moisture absorbing material 22 to a periphery of the moisture absorbing material 22. During the movement, the moist air is brought into contact with the moisture absorbing material 22 which has a temperature not higher than a temperature sensitive point of the moisture absorbing material 22. As a result, the moist air is dehumidified by the moisture absorbing material 22. The dehumidified air moves along a vicinity of the air circulation wall 11 and changes into dry air. Then, the dry air is discharged from the air outlet 4 of the housing 2 to an outside of the dehumidifying device 1A.

Next, after it is estimated that moisture has been sufficiently stored in the moisture absorbing material 22 of the moisture absorbing unit 20A of the dehumidifying device 1A, the electric power supply source 25 of the heater 23 which is firmly fixed to the back surface of the substrate 21 is turned on by the control circuit 24A. Note that the heater 23 can be firmly fixed to the back surface of the substrate 21 not only by, for example, adhesion but also by, for example, pressing the heater 23 onto the substrate 21 with, for example, a frame or a mesh while causing the heater 23 and the substrate 21 to closely adhere to each other so that there is no space therebetween.

Electric power that is used to turn on the electric power supply source 25 of the heater 23 is supplied so that a temperature that is higher than the temperature sensitive point of the first moisture absorbing body 22a and is not higher than the temperature sensitive point of the second moisture absorbing body 22b is achieved. Note that it is automatically estimated by use of, for example, a timer that moisture has been sufficiently stored in the moisture absorbing material 22.

With the configuration, the moisture absorbing material 22 is heated, and only the first moisture absorbing body 22a is made hydrophobic while being heated to a temperature higher than the temperature sensitive point thereof, so that moisture absorbed from external air into the first moisture absorbing body 22a is released and moves to the second moisture absorbing body 22b.

Subsequently, for example, after the elapse of time that is set in advance by use of a timer (not illustrated), the control circuit 24A carries out control so that electric power is supplied from the electric power supply source 25 to the heater 23 so that a temperature higher than the temperature sensitive point of the second moisture absorbing body 22b is achieved. This causes moisture of the second moisture absorbing body 22b to move to the third moisture absorbing body 22c.

Similarly, the control circuit 24A carries out sequential control so that electric power is supplied from the electric power supply source 25 to the heater 23 so that a temperature higher than a corresponding sensitive point of each of the third moisture absorbing body 22c and the fourth moisture absorbing body 22d is achieved. As a result, moisture collects in a form of a waterdrop in the fourth moisture absorbing body 22d. As illustrated in FIGS. 5 and 6, the waterdrop falls through the waterdrop receiving section 14 so as to be stored in the water drain tank 6.

Water that has collected in the water drain tank 6 can be emptied from the water drain tank 6 after the water drain tank 6 is drawn from the housing 2.

As described earlier, the moisture absorbing material 22 of Embodiment 1 has (a) a first state in which the moisture absorbing material 22 is capable of absorbing moisture and (b) a second state in which the moisture absorbing material 22 releases the moisture absorbed in the first state, and has a property of changing from the first state to the second state in response to an external stimulus and returning from the second state to the first state when the external stimulus disappears.

In such a case where the moisture absorbing material 22 is formed as a single body, moisture is absorbed by the moisture absorbing material 22 from moist air in the first state, and thereafter the moisture is released by changing the first state to the second state by providing a stimulus.

Note, however, that it is practically difficult to collectively extract the moisture in a small amount and consequently the moisture is difficult to extract and collect. Thus, a conventional dehumidifying device such as a zeolite system is forced to employ an inefficient collection method in which moisture is collected by being evaporated by applying a large quantity of heat to a moisture absorbing material.

In contrast, according to Embodiment 1, the first through fourth moisture absorbing bodies 22a through 22d which have respective different stimulus response levels are provided in order of stimulus response level so as to be in contact with one another. With the configuration, in a case where the first moisture absorbing body 22a receives a stimulus whose level is higher than the stimulus response level of the first moisture absorbing body 22a, the first state of the first moisture absorbing body is changed to the second state, and moisture absorbed by the first moisture absorbing body moves to the second moisture absorbing body 22b which is adjacent to the first moisture absorbing body and is in the first state. This causes an amount of moisture of the second moisture absorbing body 22b to be a total of (a) an amount of the moisture moved from the first moisture absorbing body 22a and (b) an amount of moisture absorbed by the second moisture absorbing body 22b.

By continuing carrying out similar processes with respect to the subsequent moisture absorbing bodies up to the fourth moisture absorbing body 22d in sequence, a total amount of moisture of the first through fourth moisture absorbing bodies 22a through 22d is stored in the fourth moisture absorbing body 22d. This causes the moisture to appear as a waterdrop in the fourth moisture absorbing body 22d. Thus, the moisture can be collected by, for example, a free fall without the need to apply heat whose quantity is large enough to evaporate the moisture.

Thus, it is possible to provide the moisture absorbing material 22 which makes it possible to efficiently release absorbed moisture without use of a large quantity of heat.

Further, as compared with a configuration in which the first through fourth moisture absorbing bodies 22a through 22d as a whole are set at a single stimulus response level and water that is absorbed while a place where a stimulus is to be provided is being moved is moved so as to be gathered at one end of the first through fourth moisture absorbing bodies 22a through 22d, a configuration in which the first through fourth moisture absorbing bodies 22a through 22d which have respective different stimulus response levels as described earlier are made in contact with one another makes it unnecessary to provide heat insulation equipment between heated regions or makes it possible to simplify such heat insulation equipment.

Specifically, as compared with a configuration in which a place where heat is to be provided is changed by use of a single sheet of gel, a configuration in which gels that have respective different temperature sensitive points are specially connected and arranged has a meaning of prevention of backflow of water that is being gathered while being moved in one direction. In a case where a single sheet of gel is used, water returns to a gel region, from which the water has already been moved, unless heat continues to be applied also to the gel region. That is, the moisture absorbing material 22 of Embodiment 1 is more excellent than the case where a single sheet of gel is used.

Further, according to the moisture absorbing material 22 of Embodiment 1, the stimulus causes the first through fourth moisture absorbing bodies 22a through 22d to exhibit, in accordance with respective stimulus response levels, hydrophilicity as the first state and hydrophobicity as the second state.

With the configuration, the stimulus causes the first through Nth moisture absorbing bodies (N is an integer of not less than 2) to exhibit, in accordance with respective stimulus response levels, hydrophilicity as the first state and hydrophobicity as the second state. This makes it possible to provide a moisture absorbing material that makes it possible to efficiently release absorbed moisture by use of any of various stimuli without use of a large quantity of heat.

Note here that as an external stimulus, it is possible to employ, for example, heat, an electrical field, light, electricity, or pH. With the configuration, any of such various stimulating factors can be used so that the moisture absorbing material 22 changes from to the second state and then returns to the first state when the external stimulus disappears. This achieves greater versatility. Further, it is possible to easily select respective different stimulus response levels for these stimulating factors. Note that as a stimulus response level, a wavelength or an intensity, for example is used in the case of a light stimulus, a voltage, for example is used in the case of electricity, and a pH value is used in the case of pH.

According to the moisture absorbing material 22 of Embodiment 1, the stimulus is heat; the first through fourth moisture absorbing bodies 22a through 22d have respective different temperature sensitive points, each of which is a stimulus response level; and the first through fourth moisture absorbing bodies 22a through 22d each exhibit (i) hydrophilicity as the first state in a temperature range not higher than a corresponding temperature sensitive point and (ii) hydrophobicity as the second state in a temperature range higher than the corresponding temperature sensitive point.

With the configuration, the first through fourth moisture absorbing bodies 22a through 22d have respective different temperature sensitive points and are provided in ascending order. As a result, in a case where the first through fourth moisture absorbing bodies 22a through 22d are heated, in an order of the first through fourth moisture absorbing bodies 22a through 22d, to a temperature higher than a corresponding temperature sensitive point of each of the first through fourth moisture absorbing bodies 22a through 22d, moisture absorbed by each of the first through fourth moisture absorbing bodies 22a through 22d can be collected in a form of a waterdrop in the fourth moisture absorbing body 22d without a backflow thereof.

Thus, it is possible to provide the moisture absorbing material 22 which makes it possible to efficiently release, by use of heat without use of a large quantity of heat, moisture absorbed by the moisture absorbing material 22.

According to the moisture absorbing material 22 of Embodiment 1, any two adjacent moisture absorbing bodies of the first through fourth moisture absorbing bodies 22a through 22d are provided so as to be in contact with each other in a side-by-side state.

The configuration makes it possible to efficiently absorb moisture by causing moist air to orthogonally collide with a plane of the first through fourth moisture absorbing bodies 22a through 22d.

Note that the moisture absorbing material 22 in which any two adjacent moisture absorbing bodies are provided so as to be in contact with each other in a side-by-side state is preferably configured such that the any two adjacent moisture absorbing bodies are connected in a vertical direction. Specifically, it is preferable that the first moisture absorbing body 22a and the fourth moisture absorbing body 22d be located in an uppermost part and a lowermost part, respectively, of the moisture absorbing material 22. The configuration allows a free fall, by gravity, of waterdrops having collected in the fourth moisture absorbing body 22d and thus facilitates separation of the waterdrops from the fourth moisture absorbing body 22d.

The dehumidifying device 1A of Embodiment 1 includes: the moisture absorbing material 22 including the first through fourth moisture absorbing bodies 22a through 22d; the heater 23, serving as a heating section, for heating the first through fourth moisture absorbing bodies 22a through 22d; and the control circuit 24A, serving as a control section, for subjecting the first through fourth moisture absorbing bodies 22a through 22d, each having absorbed moisture, to control of heating by the heater 23 so that the first through fourth moisture absorbing bodies 22a through 22d each have a temperature in a range higher than a corresponding temperature sensitive point of each of the first through fourth moisture absorbing bodies 22a through 22d.

According to the configuration, by causing the control circuit 24A to carry out control of heating by the heater 23, it is possible to subject the first through fourth moisture absorbing bodies 22a through 22d, each having absorbed moisture, to temperature control in an order of the first through fourth moisture absorbing bodies 22a through 22d so that the first through fourth moisture absorbing bodies 22a through 22d each have a temperature in a range higher than a corresponding temperature sensitive point of each of the first through fourth moisture absorbing bodies 22a through 22d.

Thus, it is possible to provide the dehumidifying device 1A which causes the first through fourth moisture absorbing bodies 22a through 22d to absorb indoor moist air and allows indoor dehumidification by collecting absorbed moisture in a form of a waterdrop in the fourth moisture absorbing body 22d without a backflow of the moisture.

A dehumidifying method of Embodiment 1 uses the moisture absorbing material 22 (i) having (a) a first state in which the moisture absorbing material 22 is capable of absorbing moisture and (b) a second state in which the moisture absorbing material 22 releases the moisture absorbed in the first state and (ii) having a property of changing from the first state to the second state in response to an external stimulus and returning from the second state to the first state when the external stimulus disappears. The dehumidifying method of Embodiment 1 includes the steps of: providing the first through fourth moisture absorbing bodies 22a through 22d in order of stimulus response level so that the first through fourth moisture absorbing bodies 22a through 22d are in contact with one another, the first through fourth moisture absorbing bodies 22a through 22d having respective different stimulus response levels; and providing each of the first through fourth moisture absorbing bodies 22a through 22d, each having absorbed moisture, with a stimulus whose level is higher than a corresponding stimulus response level of each of the first through fourth moisture absorbing bodies 22a through 22d.

The configuration makes it possible to provide a dehumidifying method that makes it possible to efficiently release, without use of a large quantity of heat, moisture absorbed by the moisture absorbing material 22.

Note that the present invention is not limited to the embodiment above, but may be altered in various ways by a skilled person within the scope of the present invention. For example, according to the embodiment above, the temperature sensitive points of the first through fourth moisture absorbing bodies 22a through 22d increase in ascending order from a first end of the moisture absorbing material 22 to a second end of the moisture absorbing material 22, which second end is opposite from the first end. Note, however, that the present invention can be configured such that two pairs of the first through fourth moisture absorbing bodies 22a through 22d are prepared and the two pairs are connected so that the first through fourth moisture absorbing bodies 22a through 22d of one of the two pairs and the fourth through first moisture absorbing bodies 22d through 22a of the other of the two pairs are provided in this order, or the fourth through first moisture absorbing bodies 22d through 22a of one of the two pairs and the first through fourth moisture absorbing bodies 22a through 22d of the other of the two pairs are provided in this order. The configuration makes it possible to, for example, collect waterdrops at an end or a center of the moisture absorbing material 22 and release the waterdrops.

Embodiment 2

Another embodiment of the present invention is described below with reference to FIGS. 7 through 9. Note that configurations that are not described in Embodiment 2 are identical to those described in Embodiment 1. Note also that, for convenience, members having functions identical to those of the respective members illustrated in the drawings of Embodiment 1 are given respective identical reference numerals, and a description of those members is omitted here.

According to the dehumidifying device 1A of Embodiment 1, the heater 23 which is shared by the four first through fourth moisture absorbing bodies 22a through 22d is integrated with the substrate 21 by adhering to the back surface of the substrate 21. Meanwhile, a dehumidifying device 1B of Embodiment 2 differs from the dehumidifying device 1A of Embodiment in that the dehumidifying device 1B includes first through fourth heaters 23a through 23d that are provided for respective four first through fourth moisture absorbing bodies 22a through 22d.

A configuration of the dehumidifying device 1B of Embodiment 2 is described below with reference to FIGS. 7 through 9. FIG. 7 is a cross-sectional view illustrating a configuration of the dehumidifying device 1B including a moisture absorbing unit 20B including a moisture absorbing material 22 of Embodiment 2. FIG. 8 is a block diagram illustrating a configuration of the moisture absorbing unit 20B of the dehumidifying device 1B, the moisture absorbing unit 20B including the moisture absorbing material 22. (a) of FIG. 9 illustrates a relationship between (a) an arrangement of the first through fourth moisture absorbing bodies 22a through 22d of the moisture absorbing material 22 and (b) a temperature sensitive point. (b) of FIG. 9 is a graph showing an amount of moisture of the first through fourth moisture absorbing bodies 22a through 22d at a normal temperature. (c) of FIG. 9 is a graph showing an amount of moisture of the first through fourth moisture absorbing bodies 22a through 22d when only the first moisture absorbing body 22a is heated to a temperature higher than a temperature sensitive point of the first moisture absorbing body 22a. (d) of FIG. 9 is a graph showing an amount of moisture of the first through fourth moisture absorbing bodies 22a through 22d when only the second moisture absorbing body 22b is heated to a temperature higher than a temperature sensitive point of the second moisture absorbing body 22b. (e) of FIG. 9 is a graph showing an amount of moisture of the first through fourth moisture absorbing bodies 22a through 22d when only the third moisture absorbing body 22c is heated to a temperature higher than a temperature sensitive point of the third moisture absorbing body 22c. (f) of FIG. 9 is a graph showing an amount of moisture of the first through fourth moisture absorbing bodies 22a through 22d when only the fourth moisture absorbing body 22d is heated to a temperature higher than a temperature sensitive point of the fourth moisture absorbing body 22d.

As illustrated in FIG. 7, the moisture absorbing unit 20B of the dehumidifying device 1B of Embodiment 2 includes the first through fourth heaters 23a through 23d which are provided, on a back surface of a substrate 21, for the respective four first through fourth moisture absorbing bodies 22a through 22d which are firmly fixed to a top surface of the substrate 21. Note that a boundary between the respective first through fourth heaters 23a through 23d can have a heat insulated structure.

As illustrated in FIG. 8, the first through fourth heaters 23a through 23d are each connected to a control circuit 24B. The control circuit 24B turns on/off an electric power supply source 25 for each of the first through fourth heaters 23a through 23d so as to subject the first through fourth heaters 23a through 23d to individual temperature control.

As a result, as shown in (a) through (c) of FIG. 9, the moisture absorbing unit 20B of Embodiment 2 can subject the first through fourth moisture absorbing bodies 22a through 22d to individual control of movement of moisture.

Specifically, as illustrated in (a) and (b) of FIG. 9, in a case where all the first through fourth moisture absorbing bodies 22a through 22d are set at a temperature not higher than 38° C., which is the temperature sensitive point of the first moisture absorbing body 22a, i.e., in a case where all the first through fourth moisture absorbing bodies 22a through 22d are set at 25° C., which is a normal temperature, all the first through fourth moisture absorbing bodies 22a through 22d are hydrophilic and thus are in a moisture absorbing state. In this case, it is revealed that since the fourth moisture absorbing body 22d which has a high temperature sensitive point is more hydrophilic than the first moisture absorbing body 22a which has a low temperature sensitive point, the fourth moisture absorbing body 22d absorbs a larger amount of moisture than the first moisture absorbing body 22a.

Next, the first moisture absorbing body 22a of the first through fourth moisture absorbing bodies 22a through 22d, each having absorbed moisture, is heated by the first heater 23a to a temperature higher than 38° C., which is the temperature sensitive point of the first moisture absorbing body 22a, e.g., a temperature of 39° C. In this case, as shown by a broken line in (c) of FIG. 9, almost all the moisture absorbed by the first moisture absorbing body 22a moves to the second moisture absorbing body 22b which has a higher temperature sensitive point than the first moisture absorbing body 22a. As a result, the moisture which has moved to the second moisture absorbing body 22b is combined with moisture which has been originally absorbed by the second moisture absorbing body 22b, so that the second moisture absorbing body 22b has an amount of moisture which amount is shown by the broken line. Meanwhile, the first moisture absorbing body 22a has an amount of moisture of approximately 0 (zero).

Subsequently, in a case where the first through fourth moisture absorbing bodies 22a through 22d as a whole are heated, in an order of the second moisture absorbing body 22b, the third moisture absorbing body 22c, and the fourth moisture absorbing body 22d, to a temperature higher than a corresponding temperature sensitive point of each of the second moisture absorbing body 22b, the third moisture absorbing body 22c, and the fourth moisture absorbing body 22d, as shown by broken lines in (d), (e), and (f) of FIG. 9, a peak of the amount of moisture gradually moves to the third moisture absorbing body 22c and the fourth moisture absorbing body 22d. This reveals that an amount of all moisture that has been collected in the fourth moisture absorbing body 22d serves as an amount of moisture that can be sufficiently formed into a waterdrop by last heating.

A method of use in the dehumidifying device 1B of Embodiment 2 which dehumidifying device 1B has the configuration is described below.

As illustrated in FIG. 8, the control circuit 24B of the moisture absorbing unit 20B of the dehumidifying device 1B turns on an electric power supply source (not illustrated) of an air blowing fan 13 in a state in which the electric power supply source 25 of each of the first through fourth heaters 23a through 23d is off. This allows external air to flow through an air inlet 3 of the dehumidifying device 1B (see FIG. 7). Since a flow path for the external air is narrowed by an intake air flow restricting section 12, the external air collides with a center of the moisture absorbing material 22 of the moisture absorbing unit 20B. External moist air that has collided with the center of the moisture absorbing material 22 moves along the moisture absorbing material 22 to a periphery of the moisture absorbing material 22. During the movement, the moist air is brought into contact with the moisture absorbing material 22 which has a temperature not higher than a temperature sensitive point of the moisture absorbing material 22. As a result, the moist air is dehumidified by the moisture absorbing material 22. The dehumidified air moves along a vicinity of an air circulation wall 11 and changes into dry air. Then, the dry air is discharged from an air outlet 4 of a housing 2 to an outside of the dehumidifying device 1B.

Next, after it is estimated that moisture has been sufficiently stored in the moisture absorbing material 22 of the moisture absorbing unit 20B of the dehumidifying device 1B, control is carried out by the control circuit 24B so that electric power is supplied from the electric power supply source 25 to only the first heater 23a which has adhered to the back surface of the substrate 21. Electric power that is used to carry out such control is supplied a temperature that is higher than the temperature sensitive point of the first moisture absorbing body 22a and is not higher than the temperature sensitive point of the second moisture absorbing body 22b is achieved. Note that it is automatically estimated by use of, for example, a timer that moisture has been sufficiently stored in the moisture absorbing material 22.

With the configuration, the first moisture absorbing body 22a is heated, and only the first moisture absorbing body 22a is made hydrophobic while being heated to a temperature higher than the temperature sensitive point thereof, so that moisture absorbed from external air into the first moisture absorbing body 22a is released and moves to the second moisture absorbing body 22b.

Subsequently, for example, after the elapse of time that is set in advance by use of a timer (not illustrated), the control circuit 24B carries out control so that electric power is supplied from the electric power supply source 25 to the second heater 23b so that a temperature higher than the temperature sensitive point of the second moisture absorbing body 22b is achieved. This causes moisture of the second moisture absorbing body 22b to move to the third moisture absorbing body 22c.

Similarly, the control circuit 24B carries out sequential control so that electric power is supplied from the electric power supply source 25 to each of the third heater 23c and the fourth heater 23d so that a temperature higher than a corresponding sensitive point of each of the third moisture absorbing body 22c and the fourth moisture absorbing body 22d is achieved. As a result, moisture collects in a form of a waterdrop in the fourth moisture absorbing body 22d. The waterdrop falls through a waterdrop receiving section 14 so as to be stored in a water drain tank 6.

Water that has collected in the water drain tank 6 can be emptied from the water drain tank 6 after the water drain tank 6 is drawn from the housing 2.

As described earlier, the dehumidifying device 1B of Embodiment 2 includes: the moisture absorbing material 22 including the first through fourth moisture absorbing bodies 22a through 22d; the first through fourth heaters 23a through 23d, each serving as a heating section, for heating the respective first through fourth moisture absorbing bodies 22a through 22d; and the control circuit 24B, serving as a control section, for subjecting the first through fourth moisture absorbing bodies 22a through 22d, each having absorbed moisture, to individual control of heating by the first through fourth heaters 23a through 23d so that the first through fourth moisture absorbing bodies 22a through 22d each have a temperature in a range higher than a corresponding temperature sensitive point of each of the first through fourth moisture absorbing bodies 22a through 22d.

According to the configuration, by causing the control circuit 24B to carry out individual control of heating by the first through fourth heaters 23a through 23d, it is possible to subject the first through fourth moisture absorbing bodies 22a through 22d, each having absorbed moisture, to temperature control in an order of the first through fourth moisture absorbing bodies 22a through 22d so that the first through fourth moisture absorbing bodies 22a through 22d each have a temperature in a range higher than a corresponding temperature sensitive point of each of the first through fourth moisture absorbing bodies 22a through 22d.

Thus, it is possible to provide the dehumidifying device 1B which causes the first through fourth moisture absorbing bodies 22a through 22d to absorb indoor moist air and allows indoor dehumidification by collecting absorbed moisture in a form of a waterdrop in the fourth moisture absorbing body 22d.

According to the dehumidifying device 1B of Embodiment 2, the heater 23, serving as the heating section, includes the first heater 23a, serving as the first heating body, through the fourth heater 23d, serving as the Nth heating body (N is an integer of not less than 2), the first through fourth heaters 23a through 23d corresponding to heating of the respective first through fourth moisture absorbing bodies 22a through 22d.

The control circuit 24B, serving as the control section, subjects the first through fourth moisture absorbing bodies 22a through 22d, each having absorbed moisture, to individual control of heating by the first through fourth heaters 23a through 23d so that the first through fourth moisture absorbing bodies 22a through 22d each have a temperature in a range higher than a corresponding temperature sensitive point of each of the first through fourth moisture absorbing bodies 22a through 22d.

With the configuration, according to Embodiment 2, heating is locally carried out. Thus, heating which is efficient and whose quantity is low as a whole is achieved. This makes it possible, without fail, to provide the dehumidifying device 1B which makes it possible to efficiently release absorbed moisture without use of a large quantity of heat.

Specifically, according to Embodiment 2, the first through fourth moisture absorbing bodies 22a through 22d are made higher in temperature sensitive point in ascending order. Thus, in accordance with movement of electric conduction through the first through fourth heaters 23a through 23d, water moves in one direction by heat remaining in one of any two adjacent moisture absorbing bodies which one is electrically conducted earlier than the other of the any two adjacent moisture absorbing bodies, and the water finally collects in the fourth moisture absorbing body 22d. Further, assume, for example, that heating is switched from the first moisture absorbing body 22a to the second moisture absorbing body 22b. In this case, since the first moisture absorbing body 22a is in contact with the second moisture absorbing body 22b, heat applied to the second moisture absorbing body 22b is also transmitted to the first moisture absorbing body 22a. This allows maintenance of a hydrophobic state of the first moisture absorbing body 22a, so that the water does not move as if it was prevented from flowing.

As described in Embodiments 1 and 2, the moisture absorbing material 22 of the moisture absorbing unit 20B of the dehumidifying device 1B of Embodiment 2 makes it possible to simplify, for example, execution of heat insulation work by placing gels that have respective different temperature sensitive points. That is, the first through fourth moisture absorbing bodies 22a through 22d have respective different temperature sensitive points. With the configuration, Embodiment 2 makes it possible to provide the first through fourth moisture absorbing bodies 22a through 22d with the respective first through fourth heaters 23a through 23d, which are independent. This makes it easy to clearly fix, for each of the first through fourth moisture absorbing bodies 22a through 22d, a direction in which water moves.

Embodiment 3

Still another embodiment of the present invention is described below with reference to FIG. 10. Note that configurations that are not described in Embodiment 3 are identical to those described in Embodiments 1 and 2. Note also that, for convenience, members having functions identical to those of the respective members illustrated in the drawings of Embodiments 1 and 2 are given respective identical reference numerals, and a description of those members is omitted here.

According to the dehumidifying device 1A of Embodiment 1, the moisture absorbing unit 20A includes the four first through fourth moisture absorbing bodies 22a through 22d each of which is in a shape of a flat plate and which are connected together so as to be in side-by-side contact with one another. Meanwhile, as illustrated in FIG. 10, a dehumidifying device 1C of Embodiment 3 differs from the dehumidifying device 1A of Embodiment 1 in that the dehumidifying device 1C includes four first through fourth moisture absorbing bodies 22a through 22d that are stacked.

A configuration of the dehumidifying device 1C of Embodiment 3 is described below with reference to FIG. 10. FIG. 10 is a cross-sectional view illustrating a moisture absorbing unit 20C of the dehumidifying device 1C of Embodiment 3, the moisture absorbing unit 20C including a moisture absorbing material 22.

As illustrated in FIG. 10, according to the moisture absorbing unit 20C of the dehumidifying device 1C of Embodiment 3, the moisture absorbing material 22 includes the four first through fourth moisture absorbing bodies 22a through 22d which are stacked in ascending order of temperature sensitive point from top to bottom of the moisture absorbing material 22 and which have respective different temperature sensitive points. Specifically, according to the moisture absorbing material 22, the first moisture absorbing body 22a which has a temperature sensitive point of 38° C., the second moisture absorbing body 22b which has a temperature sensitive point of 40° C., the third moisture absorbing body 22c which has a temperature sensitive point of 42° C., and the fourth moisture absorbing body 22d which has a temperature sensitive point of 44° C. are stacked so as to be in contact with one another.

Further, according to Embodiment 3, the first moisture absorbing body 22a includes a substrate-cum-heater 26 in which a substrate and a heater are integrated with each other and which is provided on a surface of the first moisture absorbing body 22a so as to be in contact with the first moisture absorbing body 22. The substrate-cum-heater 26 can be subjected to control, by a control circuit 24A (mentioned above and not illustrated), of electric power from an electric power supply source 25 (mentioned above and not illustrated) so that the moisture absorbing material 22 is heated to a temperature higher than a corresponding temperature sensitive point of each of the first through fourth moisture absorbing bodies 22a through 22d.

According to the moisture absorbing unit 20C which has the configuration, moist air is supplied from, for example, a left lateral direction of the moisture absorbing material 22 including the four first through fourth moisture absorbing bodies 22a through 22d which are stacked. Then, moisture of the moist air is absorbed by the four first through fourth moisture absorbing bodies 22a through 22d while the moist air passes through the moisture absorbing material 22. Thereafter, dry air is discharged from, for example, a right lateral direction of the moisture absorbing material 22.

Further, the moisture absorbing material 22 is heated at a temperature of the substrate-cum-heater 26 which temperature is set at, for example, a temperature higher than the temperature sensitive point of the fourth moisture absorbing body 22d, which has the highest temperature sensitive point of the first through fourth moisture absorbing bodies 22a through 22d.

With the configuration, also in a case where heat whose temperature is higher than the temperature sensitive point of the fourth moisture absorbing body 22d, which has the highest temperature sensitive point of the first through fourth moisture absorbing bodies 22a through 22d, is applied at a time, not only the heat is transmitted through the first through fourth moisture absorbing bodies 22a through 22d but also moisture moves through the first through fourth moisture absorbing bodies 22a through 22d, so that the moisture can be gathered in the fourth moisture absorbing body 22d.

As a result, waterdrops collect in the fourth moisture absorbing body 22d, which is located in a lowermost part of the moisture absorbing material 22, and the waterdrops fall downward. The waterdrops are received by a water drain tank 6 via the waterdrop receiving section 14. Water that has collected in the water drain tank 6 can be emptied from the water drain tank 6 after the water drain tank 6 is drawn from a housing 2.

As described earlier, according to the moisture absorbing unit 20C of the dehumidifying device 1C of Embodiment 3, the first through fourth moisture absorbing bodies 22a through 22d are each provided in a shape of a flat plate and any two adjacent moisture absorbing bodies of the first through fourth moisture absorbing bodies 22a through 22d are in contact with each other in a stacked state.

With the configuration, as described earlier, also in a case where heat whose temperature is higher than the temperature sensitive point of the fourth moisture absorbing body 22d, which has the highest temperature sensitive point of the first through fourth moisture absorbing bodies 22a through 22d, is applied at a time, not only the heat is transmitted through the first through fourth moisture absorbing bodies 22a through 22d but also moisture moves through the first through fourth moisture absorbing bodies 22a through 22d, so that the moisture can be gathered in the fourth moisture absorbing body 22d. Further, a gradual increase in heating temperature from a lowest temperature allows a reduction in loss during movement of water through the first through fourth moisture absorbing bodies 22a through 22d. Such a structure also allows absorption of moisture with higher efficiency by causing a polymeric material of the first through fourth moisture absorbing bodies 22a through 22d to be porous and/or by causing the substrate-cum-heater 26 to have a complex shape.

Further, Embodiment 3 makes it possible to compactly form the moisture absorbing material 22. Embodiment 3 also allows a free fall, by gravity, of waterdrops having collected in the fourth moisture absorbing body 22d and thus facilitates separation of the waterdrops from the fourth moisture absorbing body 22d.

CONCLUSION

A moisture absorbing material 22 of Aspect 1 of the present invention (i) having (a) a first state in which the moisture absorbing material 22 is capable of absorbing moisture and (b) a second state in which the moisture absorbing material 22 releases the moisture absorbed in the first state and (ii) having a property of changing from the first state to the second state in response to an external stimulus and returning from the second state to the first state when the external stimulus disappears, the moisture absorbing material includes: first through Nth moisture absorbing bodies 22a through 22N (N is an integer of not less than 2) (first through fourth moisture absorbing bodies 22a through 22d) which have respective different stimulus response levels and are provided in order of stimulus response level so as to be in contact with one another. Note that a stimulus response level refers to a threshold of a stimulus at which threshold the moisture absorbing material changes from the first state to the second state or returns from the second state to the first state.

According to the above invention, the first through Nth moisture absorbing bodies (N is an integer of not less than 2) which have respective different stimulus response levels are provided in order of stimulus response level so as to be in contact with one another. With the configuration, in a case where the first moisture absorbing body receives a stimulus whose level is higher than the stimulus response level of the first moisture absorbing body, the first state of the first moisture absorbing body is changed to the second state, and moisture absorbed by the first moisture absorbing body moves to the second moisture absorbing body which is adjacent to the first moisture absorbing body and is in the first state. This causes an amount of moisture of the second moisture absorbing body to be a total of (a) an amount of the moisture moved from the first moisture absorbing body and (b) an amount of moisture absorbed by the second moisture absorbing body.

By continuing carrying out similar processes with respect to the subsequent moisture absorbing bodies up to the Nth moisture absorbing body in sequence, a total amount of moisture of the first through Nth moisture absorbing bodies is stored in the Nth moisture absorbing body. This causes the moisture to appear as a waterdrop in the Nth moisture absorbing body. Thus, the moisture can be collected by, for example, a free fall without the need to apply heat whose quantity is large enough to evaporate the moisture.

Thus, it is possible to provide the moisture absorbing material which makes it possible to efficiently release absorbed moisture without use of a large quantity of heat.

Further, as compared with a configuration in which the first through Nth moisture absorbing bodies are set at a single stimulus response level and water that is absorbed while a place where a stimulus is to be provided is being moved is moved so as to be gathered at one end of the first through Nth moisture absorbing bodies, a configuration in which the first through Nth moisture absorbing bodies which have respective different stimulus response levels as described earlier are made in contact with one another makes it unnecessary to provide heat insulation equipment between heated regions or makes it possible to simplify such heat insulation equipment.

In Aspect 2 of the present invention, the moisture absorbing material 22 is configured such that in Aspect 1 of the present invention, the external stimulus causes the first through Nth moisture absorbing bodies (N is an integer of not less than 2) to exhibit, in accordance with the respective stimulus response levels, hydrophilicity as the first state and hydrophobicity as the second state.

Note that a stimulus is, for example, heat, an electrical field, light, electricity, or pH. Note also that as a stimulus response level corresponding to the stimulus, a wavelength or an intensity, for example is used in the case of a light stimulus, a voltage, for example is used in the case of electricity, and a pH value is used in the case of pH.

With the configuration, the stimulus causes the first through Nth moisture absorbing bodies (N is an integer of not less than 2) to exhibit, in accordance with respective stimulus response levels, hydrophilicity as the first state and hydrophobicity as the second state. This makes it possible to provide a moisture absorbing material that makes it possible to efficiently release absorbed moisture by use of the stimulus without use of a large quantity of heat.

In Aspect 3 of the present invention, the moisture absorbing material 22 is configured such that: in Aspect 1 or 2 of the present invention, the external stimulus is heat; the first through Nth moisture absorbing bodies 22a through 22N (N is an integer of not less than 2) (first through fourth moisture absorbing bodies 22a through 22d) have respective different temperature sensitive points, each of which is a stimulus response level; and the first through Nth moisture absorbing bodies 22a through 22N (N is an integer of not less than 2) (first through fourth moisture absorbing bodies 22a through 22d) each exhibit (i) hydrophilicity as the first state in a temperature range not higher than a corresponding temperature sensitive point and (ii) hydrophobicity as the second state in a temperature range higher than the corresponding temperature sensitive point.

As a result, in a case where the first through Nth moisture absorbing bodies (N is an integer of not less than 2) are heated, in an order of the first through Nth moisture absorbing bodies (N is an integer of not less than 2), to a temperature higher than a corresponding temperature sensitive point of each of the first through Nth moisture absorbing bodies (N is an integer of not less than 2), moisture absorbed by each of the first through Nth moisture absorbing bodies (N is an integer of not less than 2) can be collected in a form of a waterdrop in the Nth moisture absorbing body without a backflow thereof.

Thus, it is possible to provide the moisture absorbing material which makes it possible to efficiently release absorbed moisture by use of heat without use of a large quantity of heat.

In Aspect 4 of the present invention, the moisture absorbing material 22 is configured such that in Aspect 2 or 3 of the present invention, any two adjacent moisture absorbing bodies of the first through Nth moisture absorbing bodies 22a through 22N (N is an integer of not less than 2) (first through fourth moisture absorbing bodies 22a through 22d) are provided so as to be in contact with each other in a side-by-side state or in a stacked state.

With the configuration, in a case where any two adjacent moisture absorbing bodies of the first through Nth moisture absorbing bodies (N is an integer of not less than 2) are provided so as to be in contact with each other in a side-by-side state, it is possible to efficiently absorb moisture by causing moist air to orthogonally collide with, for example, a plane of the first through Nth moisture absorbing bodies (N is an integer of not less than 2).

Meanwhile, in a case where any two adjacent moisture absorbing bodies of the first through Nth moisture absorbing bodies (N is an integer of not less than 2) are provided so as to be in contact with each other in a stacked state, not only heat is transmitted through the first through Nth moisture absorbing bodies (N is an integer of not less than 2) in an order of the first through Nth moisture absorbing bodies (N is an integer of not less than 2) but also moisture moves through the first through Nth moisture absorbing bodies (N is an integer of not less than 2), so that the moisture can be gathered in the Nth moisture absorbing body (N is an integer of not less than 2). Further, the configuration makes it possible to compactly form the moisture absorbing material. The configuration also allows a free fall, by gravity, of waterdrops having collected in the Nth moisture absorbing body (N is an integer of not less than 2) and thus facilitates separation of the waterdrops from the Nth moisture absorbing body (N is an integer of not less than 2).

A dehumidifying device (1A, 1B, 1C) of Aspect 5 of the present invention includes: a moisture absorbing material 22 of any one of Aspects 2 through 4 of the present invention; a heating section (heater 23, substrate-cum-heater 26) for heating first through Nth moisture absorbing bodies 22a through 22N (N is an integer of not less than 2) (first through fourth moisture absorbing bodies 22a through 22d); and a control section (control circuit 24A, 24B) for subjecting the first through Nth moisture absorbing bodies 22a through 22N (N is an integer of not less than 2) (first through fourth moisture absorbing bodies 22a through 22d), each having absorbed moisture, to control of heating by the heating section (heater 23, substrate-cum-heater 26) so that the first through Nth moisture absorbing bodies 22a through 22N (N is an integer of not less than 2) (first through fourth moisture absorbing bodies 22a through 22d) each have a temperature in a range higher than a corresponding temperature sensitive point of each of the first through Nth moisture absorbing bodies 22a through 22N (N is an integer of not less than 2) (first through fourth moisture absorbing bodies 22a through 22d).

According to the above invention, by causing the control section to carry out control of heating by the heating section, it is possible to subject the first through Nth moisture absorbing bodies (N is an integer of not less than 2), each having absorbed moisture, to temperature control in an order of the first through Nth moisture absorbing bodies (N is an integer of not less than 2) so that the first through Nth moisture absorbing bodies (N is an integer of not less than 2) each have a temperature in a range higher than a corresponding temperature sensitive point of each of the first through Nth moisture absorbing bodies (N is an integer of not less than 2).

Thus, it is possible to provide the dehumidifying device which causes the first through Nth moisture absorbing bodies to absorb indoor moist air and allows indoor dehumidification by collecting absorbed moisture in a form of a waterdrop in the Nth moisture absorbing body without a backflow of the moisture.

In Aspect 6 of the present invention, the dehumidifying device 1B is configured such that: in Aspect 5 of the present invention, the heating section (heater 23) includes first through Nth heating bodies 23a through 23N (N is an integer of not less than 2) (first through fourth heating bodies 23 a through 23d) corresponding to heating of the respective first through Nth moisture absorbing bodies 22a through 22N (N is an integer of not less than 2) (first through fourth moisture absorbing bodies 22a through 22d); and the control section (control circuit 24B) subjects the first through Nth moisture absorbing bodies (N is an integer of not less than 2), each having absorbed moisture, to individual control of heating by the first through Nth heating bodies 23a through 23N (N is an integer of not less than 2) (first through fourth heating bodies 23 a through 23d) so that the first through Nth moisture absorbing bodies 22a through 22N (N is an integer of not less than 2) (first through fourth moisture absorbing bodies 22a through 22d) each have a temperature in a range higher than a corresponding temperature sensitive point of each of the first through Nth moisture absorbing bodies 22a through 22N (N is an integer of not less than 2) (first through fourth moisture absorbing bodies 22a through 22d).

With the configuration, according to an embodiment of the present invention, heating is locally carried out. Thus, heating which is efficient and whose quantity is low as a whole is achieved. This makes it possible, without fail, to provide the dehumidifying device which makes it possible to efficiently release absorbed moisture without use of a large quantity of heat.

A dehumidifying method in accordance with Aspect 7 of the present invention using a moisture absorbing material 22 (i) having (a) a first state in which the moisture absorbing material is capable of absorbing moisture and (b) a second state in which the moisture absorbing material releases the moisture absorbed in the first state and (ii) having a property of changing from the first state to the second state in response to an external stimulus and returning from the second state to the first state when the external stimulus disappears, the dehumidifying method includes the steps of: providing first through Nth moisture absorbing bodies (N is an integer of not less than 2) in order of stimulus response level so that the first through Nth moisture absorbing bodies (N is an integer of not less than 2) (first through fourth moisture absorbing bodies 22a through 22d) are in contact with one another, the first through Nth moisture absorbing bodies (N is an integer of not less than 2) (first through fourth moisture absorbing bodies 22a through 22d) having respective different stimulus response levels; and providing each of the first through Nth moisture absorbing bodies 22a through 22N (N is an integer of not less than 2) (first through fourth moisture absorbing bodies 22a through 22d), each having absorbed moisture, with a stimulus whose level is higher than a corresponding stimulus response level of each of the first through Nth moisture absorbing bodies 22a through 22N (N is an integer of not less than 2) (first through fourth moisture absorbing bodies 22a through 22d). Note that a stimulus response level refers to a threshold of a stimulus at which threshold the moisture absorbing material changes from the first state to the second state or returns from the second state to the first state.

According to the above invention, it is possible to provide a dehumidifying method that makes it possible to efficiently release moisture, absorbed by a moisture absorbing material, without use of a large quantity of heat.

Note that the present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to a moisture absorbing material, and a dehumidifying device, a dehumidifying method, a deodorizing machine, an air cleaner, or an air conditioning device in which the moisture absorbing material is used.

REFERENCE SIGNS LIST

1A Dehumidifying device
1B Dehumidifying device
1C Dehumidifying device
2 Housing
3 Air inlet
3a Grating
4 Air outlet
4a Grating
6 Water drain tank
10 Air circulation passage
11 Air circulation wall
12 Intake air flow restricting section
13 Air blowing fan
20A Moisture absorbing unit
20B Moisture absorbing unit
20C Moisture absorbing unit
21 Substrate
22 Moisture absorbing material
22a First moisture absorbing body
22b Second moisture absorbing body
22c Third moisture absorbing body
22d Fourth moisture absorbing body (Nth moisture absorbing body)
23 Heater (heating section)
23a First heater (heating section, first heating body)
23b Second heater (heating section, second heating body)
23c Third heater (heating section, third heating body)
23d Fourth heater (heating section, Nth heating body)
24A Control circuit (control section)
24B Control circuit (control section)
25 Electric power supply source
26 Substrate-cum-heater (heating section)

The invention claimed is:

1. A moisture absorbing material (i) having (a) a first state in which the moisture absorbing material is capable of absorbing moisture, and (b) a second state in which the moisture absorbing material releases the moisture absorbed in the first state, and (ii) having a property of changing from the first state to the second state in response to an external stimulus and returning from the second state to the first state when the external stimulus disappears, the moisture absorbing material comprising:
first through Nth moisture absorbing bodies (where N is an integer of not less than 2) which have respective different stimulus response levels and are provided in order of stimulus response level so as to be in contact with one another, wherein
two adjacent moisture absorbing bodies among the first through Nth moisture absorbing bodies are configured such that, in response to the external stimulus which exceeds a stimulus response level of a first one of the two adjacent moisture absorbing bodies and which does not exceed a stimulus response level of a second one of the two adjacent moisture absorbing bodies, letting moisture absorbed by the first one of the two adjacent moisture absorbing bodies move to the second one of the two adjacent moisture absorbing bodies, so that an amount of moisture in the second one of the two adjacent moisture absorbing bodies increases.

2. The moisture absorbing material as set forth in claim 1, wherein the external stimulus causes the first through Nth moisture absorbing bodies (N is an integer of not less than 2) to exhibit, in accordance with the respective stimulus response levels, hydrophilicity as the first state and hydrophobicity as the second state.

3. The moisture absorbing material as set forth in claim 1, wherein:
the external stimulus is heat;
the first through Nth moisture absorbing bodies (N is an integer of not less than 2) have respective different temperature sensitive points, each of which is a stimulus response level; and
the first through Nth moisture absorbing bodies (N is an integer of not less than 2) each exhibit (i) hydrophilicity as the first state in a temperature range not higher than a corresponding temperature sensitive point and (ii) hydrophobicity as the second state in a temperature range higher than the corresponding temperature sensitive point.

4. The moisture absorbing material as set forth in claim 2, wherein any two adjacent moisture absorbing bodies of the first through Nth moisture absorbing bodies (N is an integer of not less than 2) are provided so as to be in contact with each other in a side-by-side state or in a stacked state.

5. A dehumidifying device comprising:
a moisture absorbing material (i) having (a) a first state in which the moisture absorbing material is capable of absorbing moisture, and (b) a second state in which the moisture absorbing material releases the moisture absorbed in the first state, and (ii) having a property of changing from the first state to the second state in response to an external stimulus and returning from the second state to the first state when the external stimulus disappears, the moisture absorbing material including:
first through Nth moisture absorbing bodies (where N is an integer of not less than 2) which have respective different stimulus response levels and are provided in order of stimulus response level so as to be in contact with one another, wherein the external stimulus causes the first through Nth moisture absorbing bodies to exhibit, in accordance with the respective stimulus response levels, hydrophilicity as the first state and hydrophobicity as the second state;
a heater that heats the first through Nth moisture absorbing bodies; and
control circuitry that subjects the first through Nth moisture absorbing bodies, each having absorbed moisture, to control of heating by the heater so that the first through Nth moisture absorbing bodies each have a temperature in a range higher than a corresponding temperature sensitive point of each of the first through Nth moisture absorbing bodies.

6. The dehumidifying device as set forth in claim 5, wherein:

the heater includes first through Nth heating bodies corresponding to heating of the respective first through Nth moisture absorbing bodies; and the control circuitry subjects the first through Nth moisture absorbing bodies, each having absorbed moisture, to individual control of heating by the first through Nth heating bodies so that the first through Nth moisture absorbing bodies each have a temperature in a range higher than a corresponding temperature sensitive point of each of the first through Nth moisture absorbing bodies.

7. A dehumidifying method using a moisture absorbing material (i) having (a) a first state in which the moisture absorbing material is capable of absorbing moisture and (b) a second state in which the moisture absorbing material releases the moisture absorbed in the first state and (ii) having a property of changing from the first state to the second state in response to an external stimulus and returning from the second state to the first state when the external stimulus disappears, the dehumidifying method comprising:

providing first through Nth moisture absorbing bodies (where N is an integer of not less than 2) in order of stimulus response level so that the first through Nth moisture absorbing bodies are in contact with one another, the first through Nth moisture absorbing bodies having respective different stimulus response levels; and providing each of the first through Nth moisture absorbing bodies, each having absorbed moisture, with a stimulus whose level is higher than a corresponding stimulus response level of each of the first through Nth moisture absorbing bodies, wherein two adjacent moisture absorbing bodies among the first through Nth moisture absorbing bodies, in response to the external stimulus which exceeds a stimulus response level of a first one of the two adjacent moisture absorbing bodies and which does not exceed a stimulus response level of a second one of the two adjacent moisture absorbing bodies, letting moisture absorbed by the first one of the two adjacent moisture absorbing bodies move to the second one of the two adjacent moisture absorbing bodies, so that an amount of moisture in the second one of the two adjacent moisture absorbing bodies increases.

\* \* \* \* \*